US012664535B2

(12) United States Patent
Hiramatsu et al.

(10) Patent No.: US 12,664,535 B2
(45) Date of Patent: Jun. 23, 2026

(54) POINT-OF-SALE SYSTEM

(71) Applicant: Toshiba Tec Kabushiki Kaisha, Tokyo (JP)

(72) Inventors: Naotake Hiramatsu, Tokyo (JP); Tsuyoshi Gotanda, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 58 days.

(21) Appl. No.: 18/447,238

(22) Filed: Aug. 9, 2023

(65) Prior Publication Data

US 2024/0095706 A1 Mar. 21, 2024

(30) Foreign Application Priority Data

Sep. 16, 2022 (JP) ................................. 2022-148118

(51) Int. Cl.
*G06Q 20/20* (2012.01)

(52) U.S. Cl.
CPC ......... *G06Q 20/204* (2013.01); *G06Q 20/208* (2013.01)

(58) Field of Classification Search
CPC ........................... G06Q 20/204; G06Q 20/208
See application file for complete search history.

(56) References Cited

U.S. PATENT DOCUMENTS

| | | | | |
|---|---|---|---|---|
| 5,494,136 A | * | 2/1996 | Humble | ................... A47F 9/047 |
| | | | | 235/383 |
| 7,909,248 B1 | * | 3/2011 | Goncalves | .......... G07G 1/0072 |
| | | | | 235/462.14 |

| | | | | |
|---|---|---|---|---|
| 2004/0262391 A1 | * | 12/2004 | Harris | ................... G06Q 20/20 |
| | | | | 235/454 |
| 2011/0055031 A1 | * | 3/2011 | Takagi | ................... G06Q 30/06 |
| | | | | 705/16 |
| 2017/0316271 A1 | * | 11/2017 | Saitou | ................... G06Q 20/20 |

(Continued)

FOREIGN PATENT DOCUMENTS

| | | | | |
|---|---|---|---|---|
| JP | 2019096074 A | | 6/2019 | |
| JP | 2019121083 A | * | 7/2019 | ............. G02B 13/04 |

(Continued)

OTHER PUBLICATIONS

Falcão, João Diogo, et al. "Isacs: In-store autonomous checkout system for retail." Proceedings of the ACM on Interactive, Mobile, Wearable and Ubiquitous Technologies 5.3 (2021): 1-26. (Year: 2021).*

(Continued)

*Primary Examiner* — Nathan A Mitchell
(74) *Attorney, Agent, or Firm* — Kim & Stewart LLP

(57) ABSTRACT

A point-of-sale system includes a registration device configured to register items for a transaction, a plurality of payment devices with which payment for the transaction can be made, and an imaging device including a camera configured to capture images in an area where the registration device and the payment devices are located and a processor that is configured to determine, based on the images captured by the camera, one of the plurality of payment devices as a destination for sending payment data for the transaction. The payment data is sent to the payment device determined to be the destination and not sent to other payment devices of the plurality of payment devices.

18 Claims, 16 Drawing Sheets

(56)         References Cited

U.S. PATENT DOCUMENTS

2018/0232796 A1      8/2018  Glaser et al.
2022/0391871 A1 *  12/2022  Yamaguchi ............ G06Q 20/20

FOREIGN PATENT DOCUMENTS

JP          2020-510900  A      4/2020
JP          2021-015375  A      2/2021

OTHER PUBLICATIONS

Japanese Office Action dated Sep. 24, 2025, mailed in counterpart
Japanese Application No. 2022-148118, 6 pages (with translation).

* cited by examiner

FIG.17

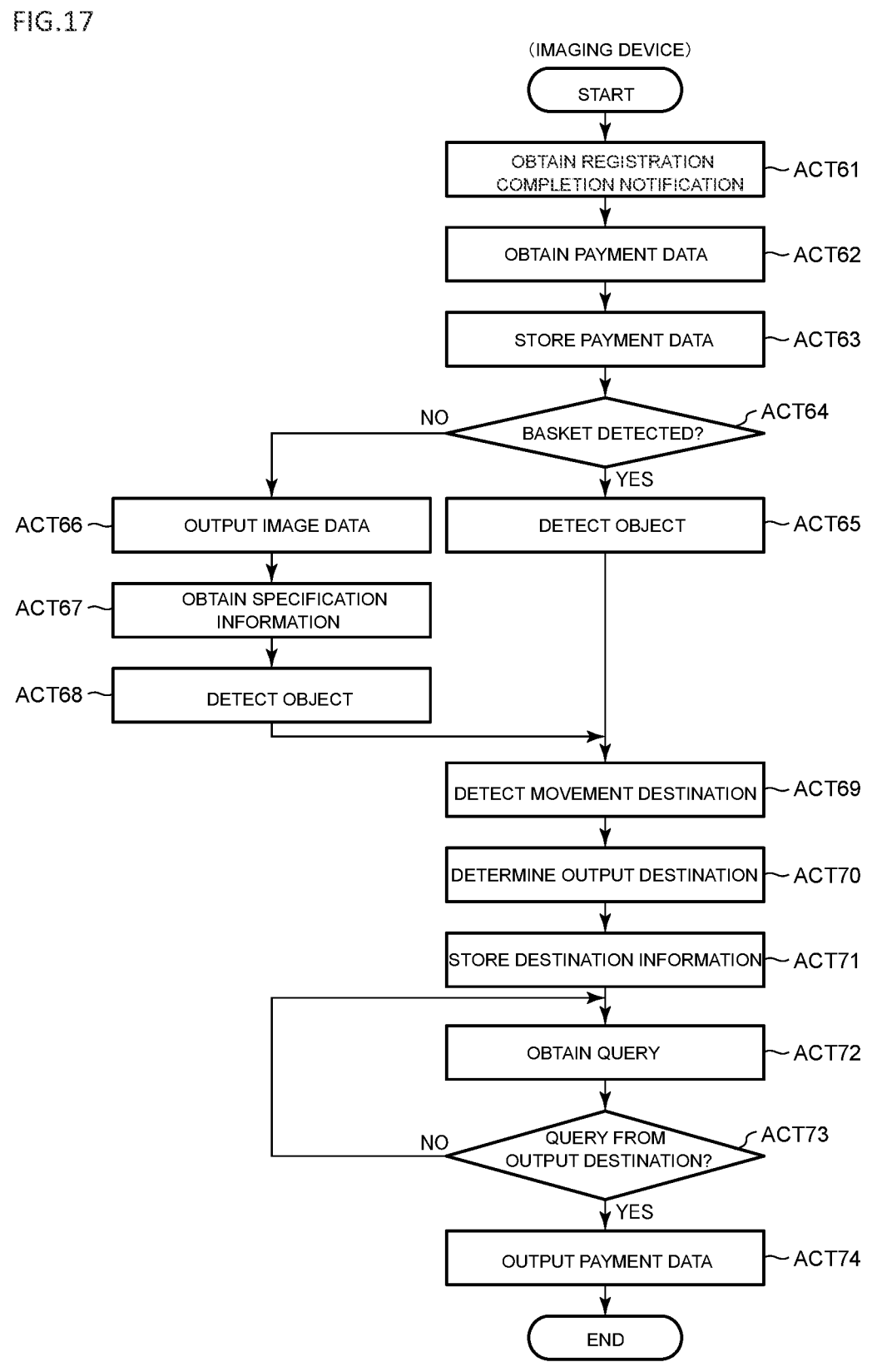

(IMAGING DEVICE)

START

OBTAIN REGISTRATION COMPLETION NOTIFICATION — ACT61

OBTAIN PAYMENT DATA — ACT62

STORE PAYMENT DATA — ACT63

BASKET DETECTED? — ACT64

NO

ACT66 — OUTPUT IMAGE DATA

YES

DETECT OBJECT — ACT65

ACT67 — OBTAIN SPECIFICATION INFORMATION

ACT68 — DETECT OBJECT

DETECT MOVEMENT DESTINATION — ACT69

DETERMINE OUTPUT DESTINATION — ACT70

STORE DESTINATION INFORMATION — ACT71

OBTAIN QUERY — ACT72

QUERY FROM OUTPUT DESTINATION? — ACT73

NO

YES

OUTPUT PAYMENT DATA — ACT74

END

POINT-OF-SALE SYSTEM

CROSS-REFERENCE TO RELATED APPLICATION

This application is based upon and claims the benefit of priority from Japanese Patent Application No. 2022-148118, filed Sep. 16, 2022, the entire contents of which are incorporated herein by reference.

FIELD

Embodiments described herein relate generally to a point-of-sale system.

BACKGROUND

In retail businesses, checkout methods using separate devices for item registration operations and payment operations are widely used. Such checkout methods include a semi-self-service method, a method using a mobile registration terminal having an item registration function and attached to a shopping cart, and a method using a mobile terminal owned by a consumer or provided by a store for registration of items. In such checkout methods, item registration operations are performed by a clerk or a customer, and a payment operation is performed by the customer.

In a semi-self-service method, a clerk performs item registration operations on a registration device and after completing the item registration operations, performs an operation for specifying a payment device to be used by a customer for payment.

In this method, for example, the clerk needs to visually check the states of multiple payment devices before specifying one of the payment devices to be used by the customer for payment. These operations increase the workload of the clerk.

An aspect of this disclosure provides a technology that makes it possible to reduce the workload of the clerk operating a registration device.

BRIEF DESCRIPTION OF THE DRAWINGS

FIG. 17 is a flowchart illustrating a process performed by a processor of an imaging device in the third operation example according to an embodiment.

DETAILED DESCRIPTION

Figure 1:
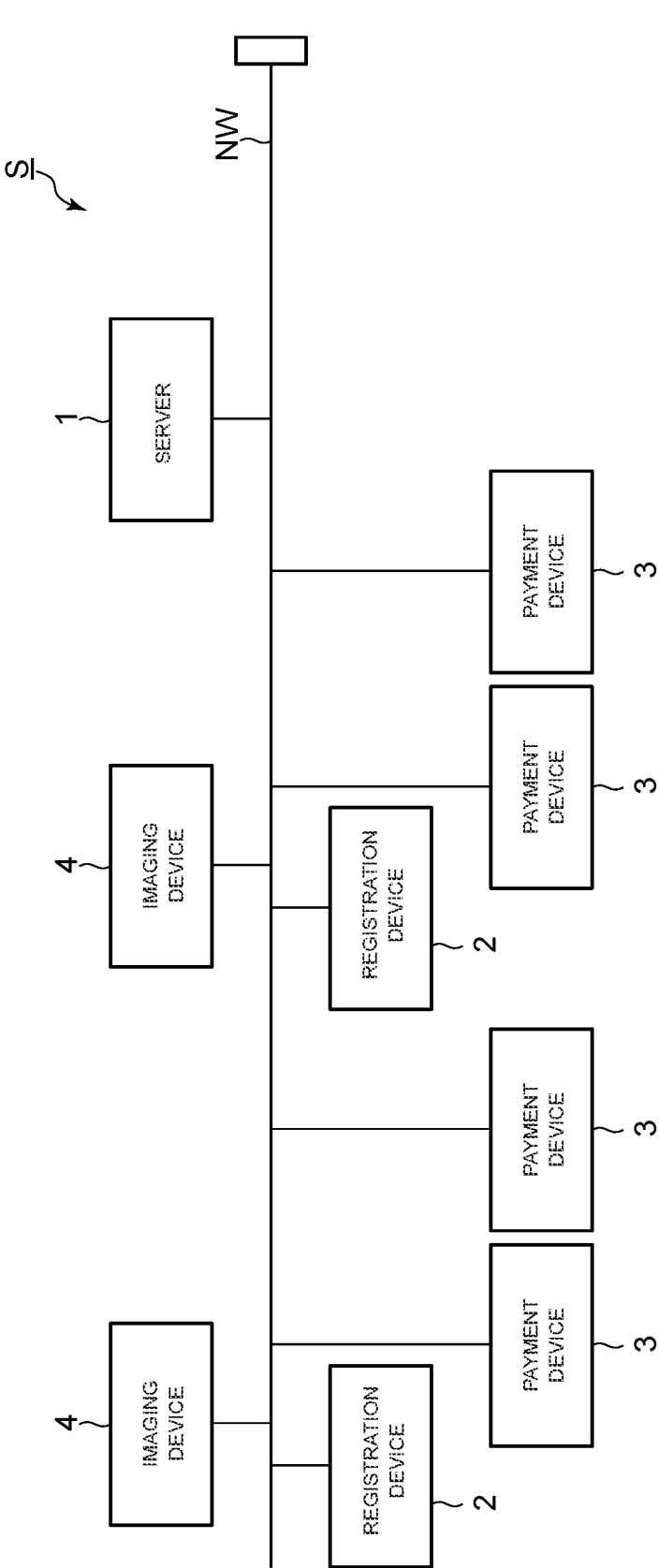
FIG. 1 is a block diagram illustrating a data processing system according to an embodiment.

Embodiments provide a point-of-sale system that includes a registration device configured to register items for a transaction, a plurality of payment devices with which payment for the transaction can be made, and an imaging device including a camera configured to capture images in an area where the registration device and the payment devices are located and a processor that is configured to determine, based on the images captured by the camera, one of the plurality of payment devices as a destination for sending payment data for the transaction. The payment data is sent to the payment device determined to be the destination and not sent to other payment devices of the plurality of payment devices.

Hereinafter, embodiments will be described in detail with reference to the drawings. The present invention is not limited to the embodiments described below.

Embodiment

An embodiment is described below with reference to the drawings. The same reference number is assigned to the same or similar components in the drawings, and repeated descriptions of those components may be omitted.

Example of Configuration

FIG. 1 is a block diagram illustrating a data processing system S according to an embodiment. The data processing system S is configured to process data in a store. The data processing system S implements a semi-self-service check-out method in which separate devices are used for item registration operations and payment operations.

The data processing system S includes a server 1, multiple registration devices 2, multiple payment devices 3, and multiple imaging devices 4. The server 1, the multiple registration devices 2, the multiple payment devices 3, and the multiple imaging devices 4 are connected via a network NW to be able to communicate with each other. For example, the network NW is a local area network (LAN). The network NW may be a wireless network and/or a wired network.

Although the server 1 is illustrated in FIG. 1, the data processing system S may also be configured to not include the server 1. Although multiple registration devices 2 are illustrated in FIG. 1, the data processing system S may also be configured to include only one registration device 2. Although multiple imaging devices 4 are illustrated in FIG. 1, the data processing system S may also be configured to include only one imaging device 4. The data processing system S does not necessarily include all of the electronic devices described above. The data processing system S may also be a system including at least one electronic device.

The server 1 is an electronic device capable of processing data. The server 1 is an example of an electronic device different from the registration devices 2. The server 1 is an example of an information processing apparatus. An example of a configuration of the server 1 is described later.

Each registration device 2 is an electronic device capable of registering items in each transaction. A transaction indicates a business transaction between a customer and a store to buy and sell items. A process performed by the registration device 2 to register an item is referred to as item registration. An item registered by the registration device 2 is referred to as a registered item. An item not registered by the registration device 2 is referred to as an unregistered item. The registration device 2 generates first payment data based on item registration for a transaction. The first payment data is an example of payment data used for payment of a transaction. The first payment data may be any type of data usable for processing payment of a transaction in the payment device 3 and may include any appropriate information. For example, the first payment data is transaction data including item data for each registered item in a transaction and billing amount data of the transaction. The item data may include various types of information, such as an item name and a price, on the item. The first payment data may also include a transaction number for identifying the transaction. The first payment data is an example of data related to a transaction. An example of a configuration of the registration device 2 is described later.

Each payment device 3 is an electronic device capable of processing the payment of a transaction based on item registration at the registration device 2. The transaction based on item registration at the registration device 2 is a transaction of items registered at the registration device 2. The payment includes payment that is being made in the amount equal to the price of an item in the transaction. The term "payment" includes the meaning of "checkout". An example of a configuration of the payment device 3 is described later.

Each imaging device 4 is an electronic device capable of generating image data based on images captured thereby. Hereinafter, the image data generated by the imaging device 4 based on images captured by the imaging device is referred to as captured image data. For example, the captured image data is video data. The imaging device 4 is more generally referred to as a sensing device. The captured image data is an example of data generated by the sensing device. The imaging device 4 is an example of an electronic device different from the registration device 2. An example of a configuration of the imaging device 4 is described later.

Figure 2:
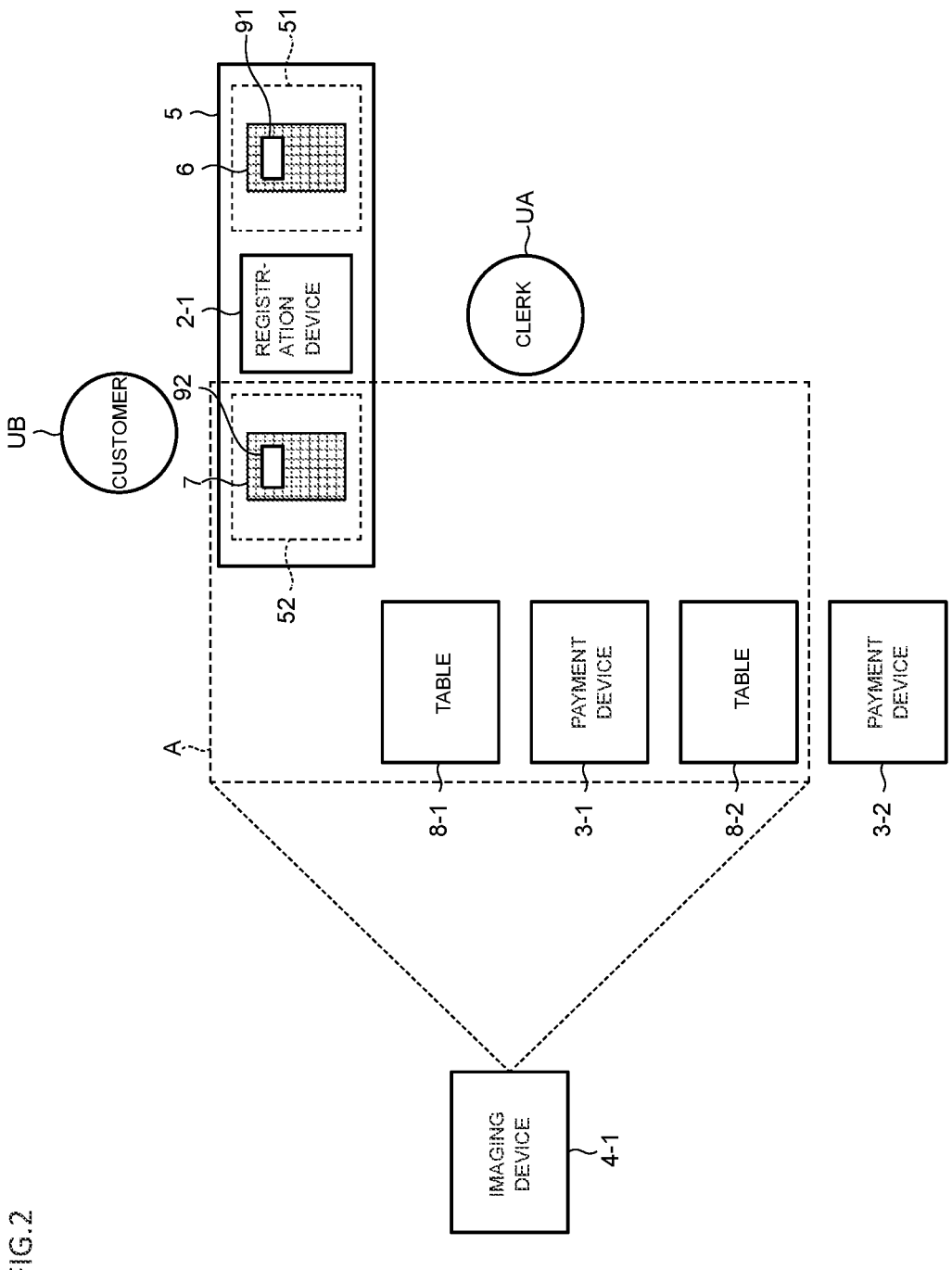
FIG. 2 is a diagram illustrating a layout of a store in which a data processing system according to an embodiment is employed.

A layout of a store in which the data processing system S is employed is described below. FIG. 2 illustrates a layout of a store in which the data processing system S is employed.

FIG. 2 illustrates an example in which a registered item 92 in a transaction is placed in a basket 7 described later.

A registration device 2-1 is disposed on a table 5. The registration device 2-1 is one of the registration devices 2. The registration device 2-1 is to be operated by a clerk UA. The clerk UA uses the registration device 2-1 to register items in a transaction of a customer UB. The clerk UA is an example of a user of the registration device 2-1.

The table 5 includes an area 51 in which an unregistered item 91 in the transaction is placed. Although one unregistered item 91 is illustrated in FIG. 2, multiple unregistered items 91 may be placed in the area 51. A basket 6 is also placed in the area 51. The unregistered item 91 in the transaction is placed in the basket 6. Although one basket 6 is illustrated in FIG. 2, multiple baskets 6 may be placed in the area 51. The table 5 further includes an area 52 in which the registered item 92 in the transaction is placed. Although one registered item 92 is illustrated in FIG. 2, multiple registered items 92 may be placed in the area 52. The basket 7 is also placed in the area 52. The registered item 92 in the transaction is placed in the basket 7. The area 52 may also be provided between the registration device 2-1 and the clerk UA (or in front of the clerk UA). Although one basket 7 is illustrated in FIG. 2, multiple baskets 7 may be placed in the area 52.

A payment device 3-1 and a payment device 3-2 are two of the payment devices 3 enabled to process the payment of transactions based on item registration at the registration device 2-1. The payment device 3-1 and the payment device 3-2 are examples of multiple payment devices 3 enabled to process the payment of transactions based on item registration at the registration device 2-1. The number of payment devices 3 enabled to process the payment of transactions based on item registration at the registration device 2-1 may be three or more. Also, the number of payment devices 3 enabled to process the payment of transactions based on item registration at the registration device 2-1 may be one.

A table 8-1 is a place on which the customer UB places some or all of registered items 92 in a transaction of the customer UB to perform the payment of the transaction using the payment device 3-1. The table 8-1 is also a place on which the basket 7 containing some or all of registered items 92 in the transaction of the customer UB is placed. The table 8-1 is disposed in a region associated with the payment device 3-1. The region associated with the payment device 3-1 is where some or all of registered items 92 in a transaction are placed after the item registration for the transaction at the registration device 2-1 and before the payment of the transaction at the payment device 3-1. The term "region" includes the meaning of "area". When requesting the customer UB to perform the payment of a transaction at the payment device 3-1 after item registration for the transaction, the clerk UA moves the basket 7 containing some or all of the registered items 92 in the transaction from the area 52 to the table 8-1.

A table 8-2 is a place on which the customer UB places some or all of registered items 92 in a transaction of the customer UB to perform the payment of the transaction using the payment device 3-2. The table 8-2 is also a place on which the basket 7 containing some or all of registered items 92 in the transaction of the customer UB is placed. The table 8-2 is disposed in a region associated with the payment device 3-2. The region associated with the payment device 3-2 is where some or all of registered items 92 in a transaction are placed after the item registration for the transaction at the registration device 2-1 and before the payment of the transaction at the payment device 3-2. When requesting the customer UB to perform the payment of a transaction at the payment device 3-2 after item registration for the transaction, the clerk UA moves the basket 7 containing some or all of the registered items 92 in the transaction from the area 52 to the table 8-2.

The imaging device 4-1 captures an image of the area 52, the table 8-1, and the table 8-2 to detect the movement of the registered items 92 in the transaction from the area 52 to the table 8-1 or the table 8-2. The imaging device 4-1 is one of the imaging devices 4 that is associated with the registration device 2-1 among the multiple registration devices 2. For example, an imaging range A of the imaging device 4-1 includes the area 52, the table 8-1, and the table 8-2. The imaging range A of the imaging device 4-1 may also include areas near the table 8-1 and the table 8-2 in addition to the area 52, the table 8-1, and the table 8-2. The area near the table 8-1 is included in the imaging range A of the imaging device 4-1 to address a case in which the customer UB does not place the registered items 92 on the table 8-1 when performing the payment of the transaction at the payment device 3-1. For example, when the registered item 92 is a carton of drinks, the registered item 92 may be placed on a shopping cart and moved to a position near the table 8-1 instead of being placed on the table 8-1. The area near the table 8-2 is included in the imaging range A of the imaging device 4-1 for a similar reason.

As described with reference to FIG. 2, in the data processing system S, one registration device 2, multiple payment devices 3, and one imaging device 4 are associated with each other to form a group. The data processing system S includes one or more groups, the number of which corresponds to the number of registration devices 2.

Figure 3:
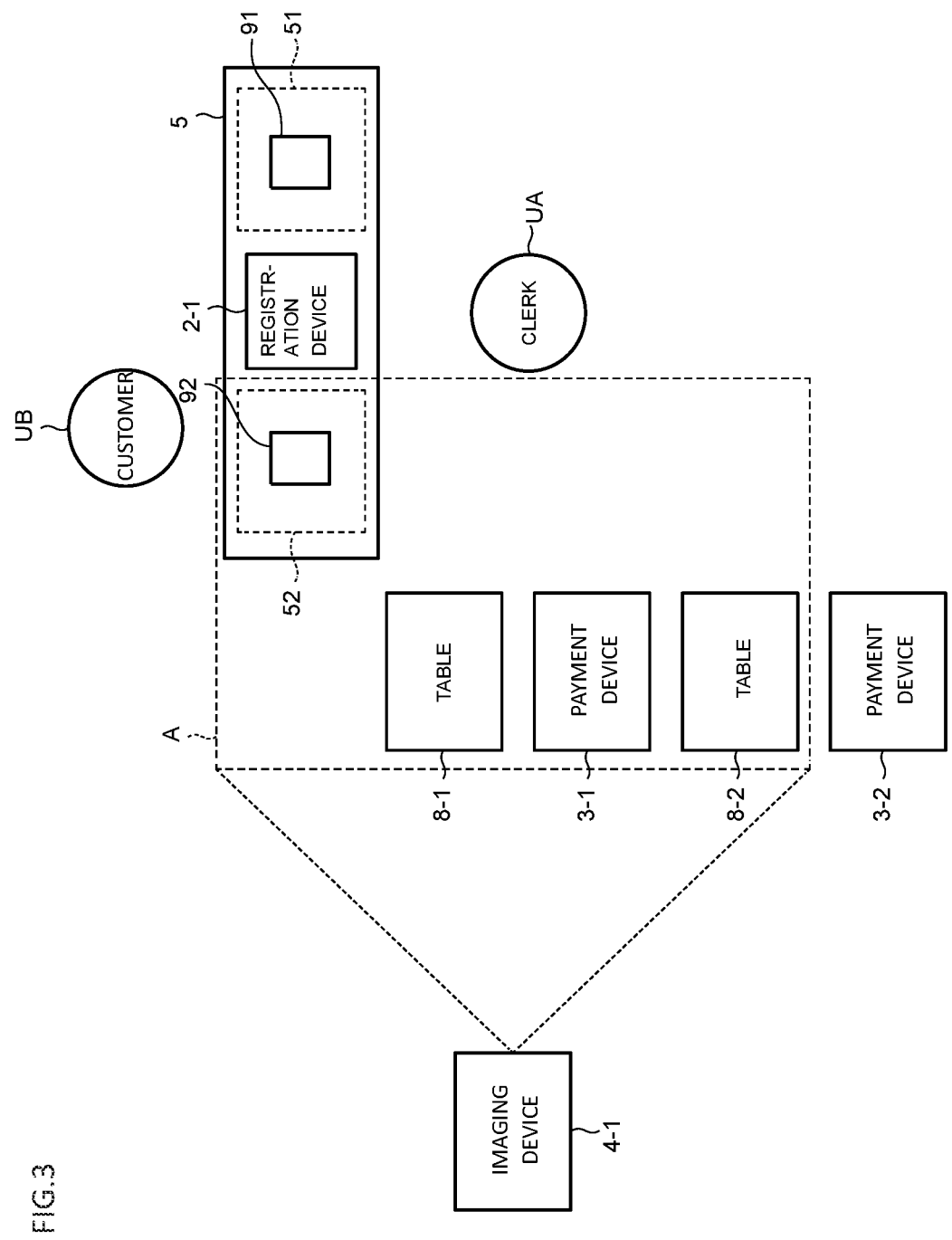
FIG. 3 is another diagram illustrating the layout of the store in which the data processing system according to the embodiment is employed.

FIG. 3 illustrates a layout of a store to which the data processing system S is employed. FIG. 3 illustrates an example in which the registered item 92 in a transaction is not placed in the basket 7.

The registered item 92 in the transaction is placed in the area 52. Although one registered item 92 is illustrated in FIG. 3, multiple registered items 92 may be placed in the area 52. For example, when the registered item 92 is a carton of drinks, the registered item 92 may be too large to be placed in the basket 7. When the registered item 92 is too large to be placed in the basket 7, the clerk UA does not use the basket 7. In such a case, the basket 7 is not placed in the area 52. When requesting the customer UB to perform the payment of a transaction at the payment device 3-1 after item registration for the transaction, the clerk UA moves some or all of the registered items 92 in the transaction from the area 52 to the table 8-1. When requesting the customer UB to perform the payment of a transaction at the payment device 3-2 after item registration for the transaction, the clerk UA moves some or all of the registered items 92 in the transaction from the area 52 to the table 8-2.

Figure 4:
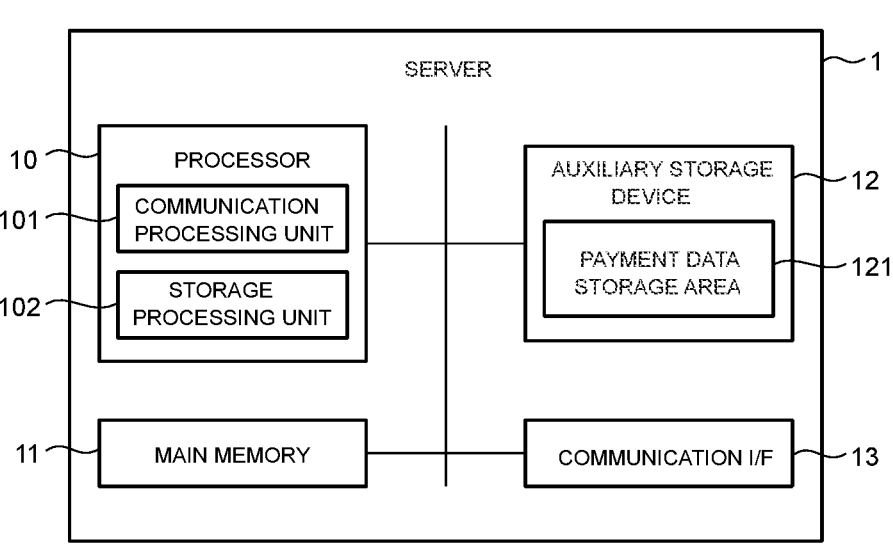
FIG. 4 is a block diagram illustrating a server according to an embodiment.

An example of a configuration of the server 1 is described below. FIG. 4 is a block diagram illustrating an example of a configuration of the server 1. The server 1 is an electronic device including a processor 10, a main memory 11, an auxiliary storage device 12, and a communication interface 13. The components included in the server 1 are connected to each other to be able to exchange signals with each other. In FIG. 4, "I/F" stands for "interface".

The processor 10 corresponds to a central unit of the server 1. The processor 10 is an element of a computer of the server 1. The processor 10 may be, but is not limited to, a central processing unit (CPU). The processor 10 may include various circuits. The processor 10 is an example of a processing circuit of the server 1. The processor 10 loads programs stored in advance in the main memory 11 or the auxiliary storage device 12 into a work area of the main memory 11. The programs cause the processor 10 to perform processes corresponding to functions implemented by the processor 10 as described later. The processor 10 performs various processes by executing the programs loaded into the main memory 11.

The main memory 11 corresponds to a main storage unit of the server 1. The main memory 11 is an element of the computer of the server 1. The main memory 11 includes a non-volatile memory area and a volatile memory area. The non-volatile memory area of the main memory 11 stores an operating system or programs. The volatile memory area of the main memory 11 is used as a work area for storing data that is written by the processor 10 as necessary. For example, the main memory 11 includes a read-only memory (ROM) as the non-volatile memory area. For example, the main memory 11 includes a random access memory (RAM) as the volatile memory area. The main memory 11 is an example of a storage unit of the server 1.

The auxiliary storage device 12 corresponds to an auxiliary storage unit of the server 1. The auxiliary storage device 12 is an element of the computer of the server 1. The auxiliary storage device 12 is, for example, an Electrically Erasable Programmable Read-Only Memory (EEPROM®), a hard disk drive (HDD), or a solid state drive (SSD). The auxiliary storage device 12 stores the programs described above, data used by the processor 10 to perform various processes, and data generated by the processes performed by the processor 10. The auxiliary storage device 12 is an example of a storage unit of the server 1.

The auxiliary storage device 12 may include a payment data storage area 121. The payment data storage area 121 can store payment data for each registration device 2. The payment data is an example of payment data used for payment of a transaction. The payment data may be any type of data usable for processing payment of a transaction in the payment device 3 and may include any appropriate information. The payment data is based on item registration at the registration device 2. That is, the payment data stored in the payment data storage area 121 is based on payment data that is obtained by the server 1 from the registration device 2. "Obtain" includes the meaning of "receive". The payment data is an example of data related to a transaction. Hereinafter, the payment data that is obtained by the server 1 from the registration device 2 is referred to as the first payment data, and the payment data stored in the payment data storage area 121 is referred to as the second payment data.

In one example, the second payment data is the same as the first payment data generated by the registration device 2. In this case, each of the first payment data and the second payment data are both transaction data.

In another example, the second payment data is generated based on the first payment data. In this case, the first payment data may be transaction data, and the second payment data may be a code for uniquely identifying a transaction. The data representing a code for uniquely identifying a transaction is associated with the transaction data. The server 1 generates data representing a code for uniquely identifying a transaction after obtaining transaction data from the registration device 2.

The payment data storage area 121 is configured to store destination information for each set of second payment data. The destination information indicates a destination payment device 3 to which payment data is to be output. The destination payment device 3 is one of payment devices 3 enabled to process the payment of transactions based on item registration at the registration device 2. The destination payment device 3 may be determined by the imaging device 4. The second payment data and the destination information are associated with each other.

The communication interface 13 includes various interfaces that connect the server 1 via the network NW to other electronic devices so that the server 1 can communicate with other electronic devices according to certain communication protocols. The communication interface 13 is an example of a communication unit of the server 1.

The hardware configuration of the server 1 is not limited to that described above. Some of the above components of the server 1 may be omitted or changed, and components may be added to the above configuration of the server 1 as appropriate.

Functions implemented by the processor 10 are described below. The processor 10 is programmed to operate as a communication processing unit 101 and a storage processing unit 102. These operational units may also be referred to as functions, or may be expressed as components implemented by a control unit including the processor 10 and the main memory 11.

The communication processing unit 101 processes communications between the server 1 and other electronic devices via the communication interface 13. The communication processing unit 101 obtains data, information, or signals from other electronic devices via the communication interface 13. The communication processing unit 101 outputs data, information, or signals from the server 1 to other electronic devices via the communication interface 13. "Output" includes the meaning of "transmit". In the case where the communication processing unit 101 obtains or outputs data, information, or signals, the communication processing unit 101 may be referred to as a communication interface.

The storage processing unit 102 stores data or information in the auxiliary storage device 12. The storage processing unit 102 may also store data or information in the main memory 11.

Figure 5:
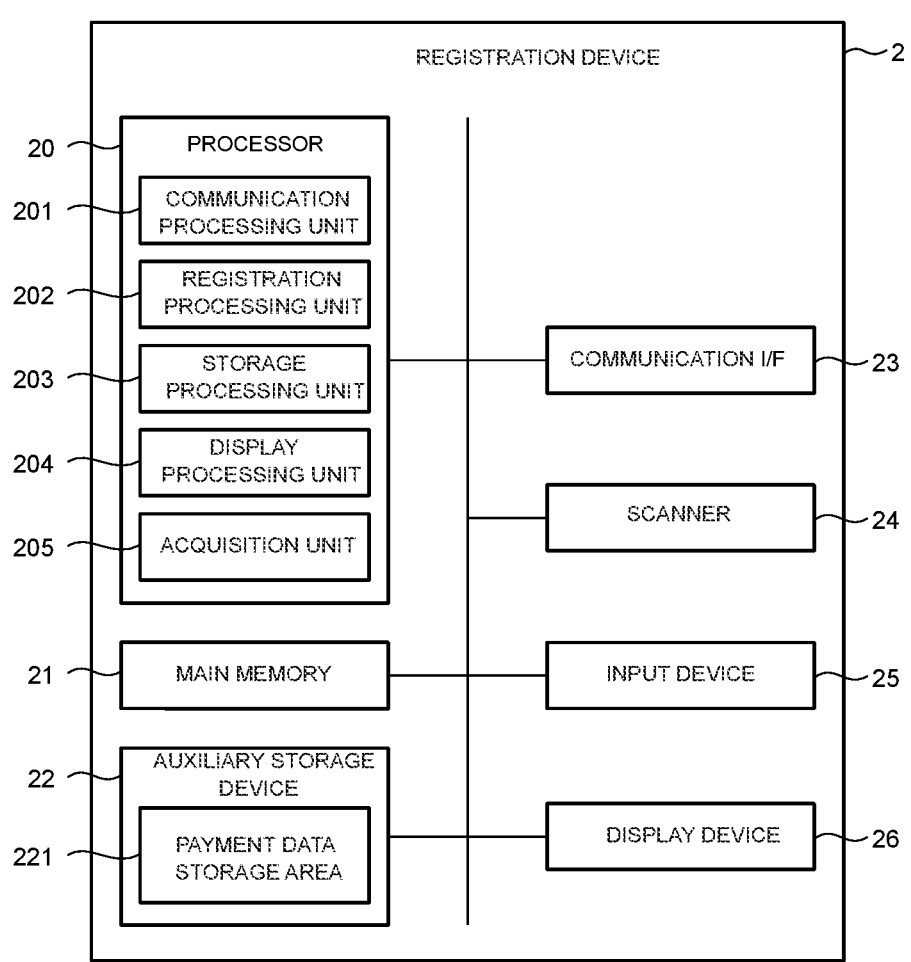
FIG. 5 is a block diagram illustrating a registration device according to an embodiment.

An example of a configuration of the registration device 2 is described below. FIG. 5 is a block diagram illustrating an example of a configuration of the registration device 2. The registration device 2 is an electronic device including a processor 20, a main memory 21, an auxiliary storage device 22, a communication interface 23, a scanner 24, an input device 25, and a display device 26. The processor 20, the main memory 21, the auxiliary storage device 22, the communication interface 23, the scanner 24, the input device 25, and the display device 26 are connected to each other to be able to exchange signals with each other. In FIG. 5, "I/F" stands for "interface".

The processor 20 corresponds to a central unit of the registration device 2. The processor 20 may have a hardware configuration similar to that of the processor 10 described above. The processor 20 is an example of a processing circuit of the registration device 2. The processor 20 loads programs stored in advance in the main memory 21 or the auxiliary storage device 22 into a work area of the main memory 21. The programs cause the processor 20 to perform processes corresponding to functions implemented by the processor 20 as described later. The processor 20 performs various processes by executing the programs loaded into the main memory 21.

The main memory 21 corresponds to a main storage unit of the registration device 2. The main memory 21 may have a hardware configuration similar to that of the main memory

11 described above. The main memory 21 stores programs. The main memory 21 is an example of a storage unit of the registration device 2.

The auxiliary storage device 22 corresponds to an auxiliary storage unit of the registration device 2. The auxiliary storage device 22 may have a hardware configuration similar to that of the auxiliary storage device 12 described above. The auxiliary storage device 22 stores the programs described above, data used by the processor 20 to perform various processes, and data generated by the processes performed by the processor 20. The auxiliary storage device 22 is an example of a storage unit of the registration device 2.

The auxiliary storage device 22 may include a payment data storage area 221. The payment data storage area 221 is configured to store the first payment data that is based on item registration for a transaction at the registration device 2. The payment data storage area 121 is configured to store destination information for the first payment data. The first payment data and the destination information are associated with each other.

The communication interface 23 includes various interfaces that connect the registration device 2 via the network NW to other electronic devices so that the registration device 2 can communicate with other electronic devices according to certain communication protocols. The communication interface 23 is an example of a communication unit of the registration device 2.

The scanner 24 is a device that reads various code symbols and obtains data from the code symbols. The scanner 24 may be implemented by, for example, an imaging device such as a charge-coupled device (CCD) or a laser scanner. For example, the code symbols are barcode symbols or two-dimensional code symbols. The code symbols may include an item code symbol representing a code for identifying an item. The item code symbol is an image provided on the item. The code symbols may include a member code symbol representing a member code for identifying a member of a store. The member code symbol may be an image provided on a card or an image displayed on a terminal.

The input device 25 is used to input instructions to the registration device 2. For example, the input device 25 may include a keyboard. The input device 25 may include a touch screen integrated with the display device 26.

The display device 26 is configured to display various images under the control of the processor 20. For example, the display device 26 is a liquid-crystal display or an electroluminescence (EL) display. The display device 26 is an example of a display unit of the registration device 2.

The hardware configuration of the registration device 2 is not limited to the example described above. Some of the above components of the registration device 2 may be omitted or changed, and components may be added to the above configuration of the registration device 2 as appropriate.

Functions implemented by the processor 20 are described below. The processor 20 is programmed to operate as a communication processing unit 201, a registration processing unit 202, a storage processing unit 203, a display processing unit 204, and an acquisition unit 205. These operational units may also be referred to as functions, or may be expressed as components implemented by a control unit including the processor 20 and the main memory 21.

The communication processing unit 201 processes communications between the registration device 2 and other electronic devices via the communication interface 23. The communication processing unit 201 obtains data, information, or signals from other electronic devices via the communication interface 23. The communication processing unit 201 outputs data, information, or signals from the registration device 2 to other electronic devices via the communication interface 23. In the case where the communication processing unit 201 obtains or outputs data, information, or signals, the communication processing unit 201 may be referred to as a communication interface.

Based on item registration operations performed by a clerk for respective items in a transaction using the scanner 24 or the input device 25, the registration processing unit 202 registers the items .

The storage processing unit 203 stores data or information in the auxiliary storage device 22. The storage processing unit 203 may also store data or information in the main memory 21.

The display processing unit 204 processes the display of images on the display device 26.

The acquisition unit 205 obtains instructions that are input through the operation of the input device 25.

Figure 6:
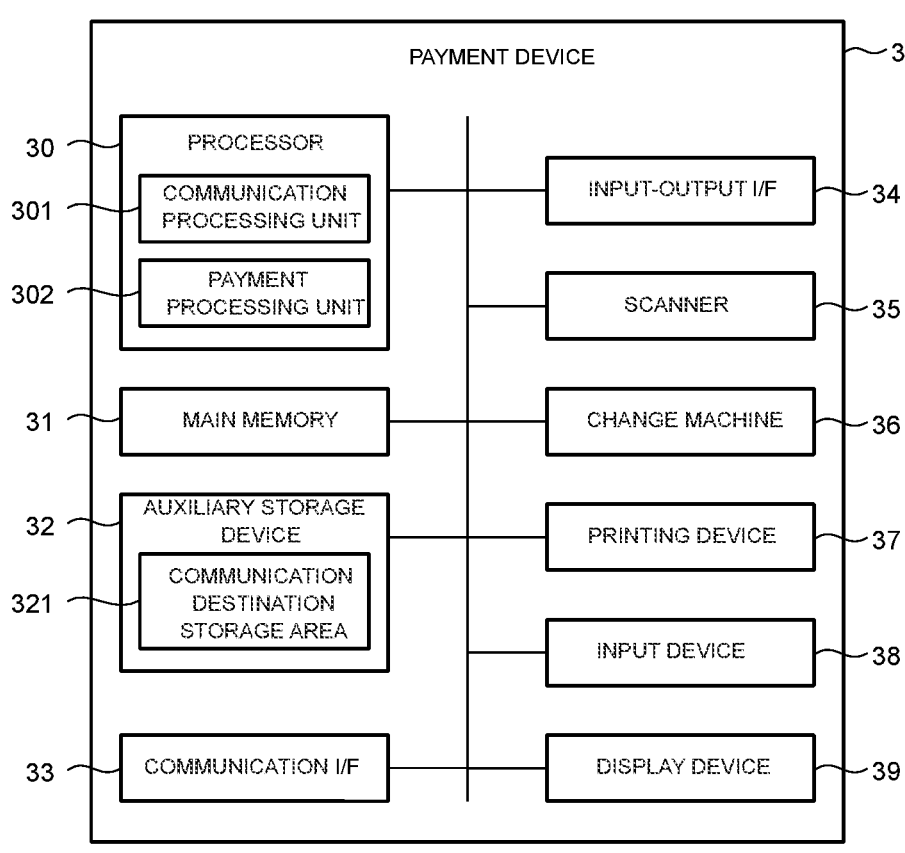
FIG. 6 is a block diagram illustrating a payment device according to an embodiment.

An example of a configuration of the payment device 3 is described below. FIG. 6 is a block diagram illustrating an example of a configuration of the payment device 3.

The payment device 3 is an electronic device including a processor 30, a main memory 31, an auxiliary storage device 32, a communication interface 33, an input-output interface 34, a scanner 35, a change machine 36, a printing device 37, an input device 38, and a display device 39. The processor 30, the main memory 31, the auxiliary storage device 32, the communication interface 33, the input-output interface 34, the scanner 35, the change machine 36, the printing device 37, the input device 38, and the display device 39 are connected to each other to be able to exchange signals with each other. In FIG. 6, "I/F" stands for "interface".

The processor 30 corresponds to a central unit of the payment device 3. The processor 30 may have a hardware configuration similar to that of the processor 10 described above. The processor 30 is an example of a processing circuit of the payment device 3. The processor 30 loads programs stored in advance in the main memory 31 or the auxiliary storage device 32 into a work area of the main memory 31. The programs cause the processor 30 to perform processes corresponding to functions implemented by the processor 30 as described later. The processor 30 performs various processes by executing the programs loaded into the main memory 31.

The main memory 31 corresponds to a main storage unit of the payment device 3. The main memory 31 may have a hardware configuration similar to that of the main memory 11 described above. The main memory 31 stores programs. The main memory 31 is an example of a storage unit of the payment device 3.

The auxiliary storage device 32 corresponds to an auxiliary storage unit of the payment device 3. The auxiliary storage device 32 may have a hardware configuration similar to that of the auxiliary storage device 12 described above. The auxiliary storage device 32 stores the programs described above, data used by the processor 30 to perform various processes, and data generated by the processes performed by the processor 30. The auxiliary storage device 32 is an example of a storage unit of the payment device 3.

The auxiliary storage device 32 may include a communication destination storage area 321. The communication destination storage area 321 is configured to store communication destination information. The communication destination information indicates electronic devices with which the payment device 3 communicates. The communication destination information includes information indicating a registration device 2 with which the payment device 3 communicates among the multiple registration devices 2 included in the data processing system S. The communication destination information includes information indicating an imaging device 4 with which the payment device 3 communicates among the multiple imaging devices 4 included in the data processing system S.

Examples of communication destination information are described using the registration device 2-1, the payment device 3-1, the payment device 3-2, and the imaging device 4-1 illustrated in FIGS. 2 and 3. Communication destination information stored in the payment device 3-1 includes information indicating the registration device 2-1 with which the payment device 3-1 communicates among the multiple registration devices 2 included in the data processing system S. The communication destination information stored in the payment device 3-1 includes information indicating the imaging device 4-1 with which the payment device 3-1 communicates among the multiple imaging devices 4 included in the data processing system S. Communication destination information stored in the payment device 3 -2 includes information indicating the registration device 2-1 with which the payment device 3-2 communicates among the multiple registration devices 2 included in the data processing system S. The communication destination information stored in the payment device 3 -2 includes information indicating the imaging device 4-1 with which the payment device 3-2 communicates among the multiple imaging devices 4 included in the data processing system S.

The communication interface 33 includes various interfaces that connect the payment device 3 via the network NW to other electronic devices so that the payment device 3 can communicate with other electronic devices according to certain communication protocols. The communication interface 33 is an example of a communication unit of the payment device 3.

The input-output interface 34 includes various interfaces that directly connect the payment device 3 to other electronic devices via wired or wireless connection to enable communications. For example, the input-output interface 34 connects the payment device 3 to a card reader. The card reader is a device that reads card data recorded in a magnetic stripe or an integrated circuit (IC) chip of a card medium. An example of the card medium is a credit card.

The scanner 35 is a device that reads various code symbols and obtains data from the code symbols. The scanner 35 may have a hardware configuration similar to that of the scanner 24 described above. For example, the code symbols may include a code symbol for code payment.

The change machine 36 is a device that dispenses bills and/or coins corresponding to the amount of change.

The printing device 37 prints a receipt. For example, the printing device 37 is a thermal printer or an inkjet printer.

The input device 38 is used to input instructions to the payment device 3. The input device 38 may have a hardware configuration similar to that of the input device 25 described above.

The display device 39 is configured to display various images under the control of the processor 30. The display device 39 may have a hardware configuration similar to that of the display device 26 described above.

The hardware configuration of the payment device 3 is not limited to the example described above. Some of the above components of the payment device 3 may be omitted or changed, and components may be added to the above configuration of the payment device 3 as appropriate.

Functions implemented by the processor 30 are described below. The processor 30 is programmed to operate as a communication processing unit 301 and a payment processing unit 302. These operational units may also be referred to as functions, or may be expressed as components implemented by a control unit including the processor 30 and the main memory 31.

The communication processing unit 301 processes communications between the payment device 3 and other electronic devices via the communication interface 33. The communication processing unit 301 obtains data, information, or signals from other electronic devices via the communication interface 33. The communication processing unit 301 outputs data, information, or signals from the payment device 3 to other electronic devices via the communication interface 33. In the case where the communication processing unit 301 obtains or outputs data, information, or signals, the communication processing unit 301 may be referred to as a communication interface.

The payment processing unit 302 processes the payment of a transaction based on payment data. The payment processing unit 302 processes the payment of a transaction according to a payment method selected by the customer. Payment methods include offline payment and online payment. In offline payment, the payment device 3 does not have to collaborate with another electronic device via a network such as the Internet. For example, offline payment is payment by cash. In online payment, the payment device 3 performs payment in collaboration with another electronic device via a network such as the Internet. Examples of online payment include credit card payment, electronic money payment, debit card payment, and code payment.

Figure 7:
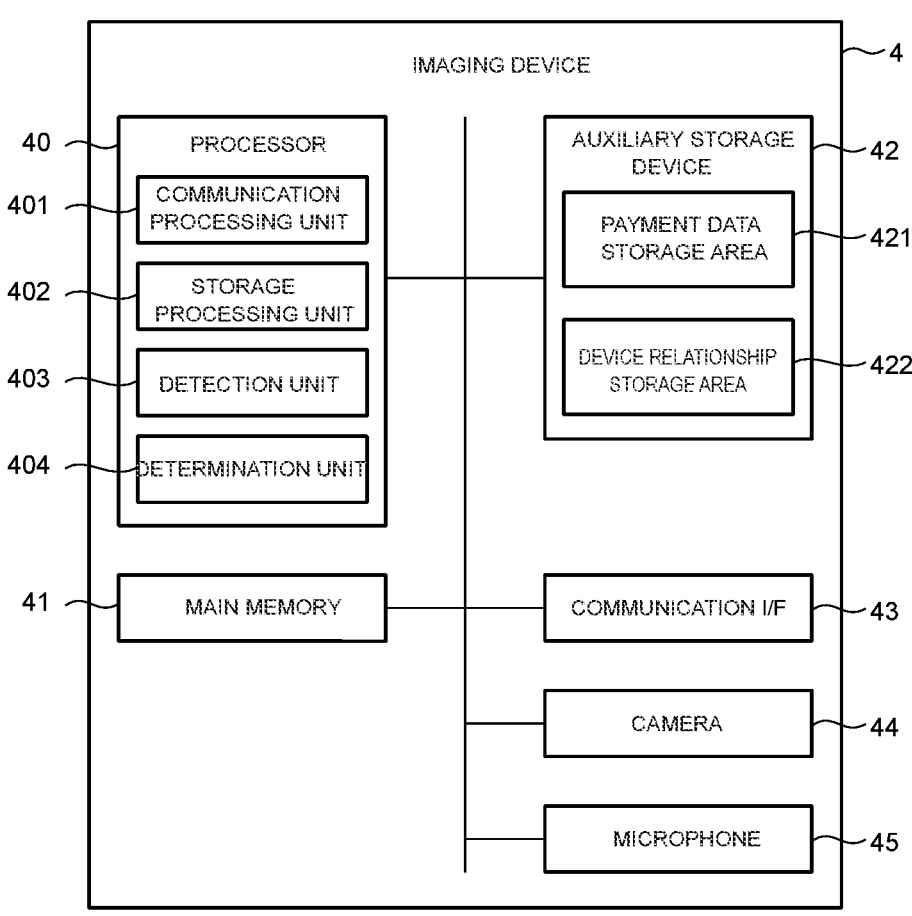
FIG. 7 is a block diagram illustrating an imaging device according to an embodiment.

An example of a configuration of the imaging device 4 is described below. FIG. 7 is a block diagram illustrating an example of a configuration of the imaging device 4. The imaging device 4 is an electronic device including a processor 40, a main memory 41, an auxiliary storage device 42, a communication interface 43, a camera 44, and a microphone 45. The processor 40, the main memory 41, the auxiliary storage device 42, the communication interface 43, the camera 44, and the microphone 45 are connected to each other to be able to exchange signals. In FIG. 7, "I/F" stands for "interface".

The processor 40 corresponds to a central unit of the imaging device 4. The processor 40 may have a hardware configuration similar to that of the processor 10 described above. The processor 40 is an example of a processing circuit of the imaging device 4. The processor 40 loads programs stored in advance in the main memory 41 or the auxiliary storage device 42 into a work area of the main memory 41. The programs cause the processor 40 to perform processes corresponding to functions implemented by the processor 40 as described later. The processor 40 performs various processes by executing the programs loaded into the main memory 41.

The main memory 41 corresponds to a main storage unit of the imaging device 4. The main memory 41 may have a hardware configuration similar to that of the main memory 11 described above. The main memory 41 stores programs. The main memory 41 is an example of a storage unit of the imaging device 4.

The auxiliary storage device 42 corresponds to an auxiliary storage unit of the imaging device 4. The auxiliary storage device 42 may have a hardware configuration similar to that of the auxiliary storage device 12 described above.

The auxiliary storage device 42 stores the programs described above, data used by the processor 40 to perform various processes, and data generated by the processes performed by the processor 40. The auxiliary storage device 42 is an example of a storage unit of the imaging device 4.

The auxiliary storage device 42 may include a payment data storage area 421. The payment data storage area 421 is configured to store payment data for the registration device 2 that is captured by the imaging device 4 and is operated by a clerk. This payment data is referred to herein as the third payment data and is an example of payment data for payment of a transaction. The third payment data may be any type of data usable for processing payment of a transaction in the payment device 3 and may include any appropriate information. The third payment data is based on item registration at the registration device 2. That is, the third payment data is based on the first payment data obtained by the imaging device 4 from the registration device 2. The third payment data is an example of data related to a transaction. For example, the third payment data is the same as the first payment data generated by the registration device 2. In this case, the first payment data and the third payment data may be transaction data. The payment data storage area 421 is configured to store destination information for the third payment data. The third payment data and the destination information are associated with each other.

The auxiliary storage device 42 may include a device relationship storage area 422. The device relationship storage area 422 is configured to store device relationship data. The device relationship data indicates regions each of which is associated with one of multiple payment devices 3. The multiple payment devices 3 are enabled to process the payment of a transaction that is based on item registration at one of the registration devices 2 associated with one of the imaging devices 4. A region associated with the payment device 3 is where the registered items 92 in a transaction are placed after the item registration for the transaction at the registration device 2 and before the payment of the transaction at the payment device 3. The region associated with the payment device 3 is not limited to a table on which the registered items 92 can be placed. The region associated with the payment device 3 may include an area that is near the table and in which a shopping cart carrying the registered items 92 is placed. The area near the table may indicate an area near the payment device 3. The area near the table may be set freely.

An example of device relationship data is described below using the registration device 2-1, the payment device 3-1, and the payment device 3-2 illustrated in FIGS. 2 and 3. The device relationship data indicates regions each of which is associated with one of the two payment devices 3-1 and 3-2. The two payment devices 3-1 and 3-2 are enabled to process the payment of transactions that are based on item registration at the registration device 2-1 associated with the imaging device 4-1. The region associated with the payment device 3-1 includes the table 8-1. The region associated with the payment device 3-1 may include an area near the table 8-1 in addition to the table 8-1. The region associated with the payment device 3-2 includes the table 8-2. The region associated with the payment device 3-2 may include an area near the table 8-2 in addition to the table 8-2.

The communication interface 43 includes various interfaces that connect the imaging device 4 via the network NW to other electronic devices so that the imaging device 4 can communicate with other electronic devices according to certain communication protocols. The communication interface 43 is an example of a communication unit of the imaging device 4.

The camera 44 is a device that generates image data based on images captured thereby.

The microphone 45 is a device that generates audio data based on recorded sound.

The hardware configuration of the imaging device 4 is not limited to the example described above. Some of the above components of the imaging device 4 may be omitted or changed, and components may be added to the above configuration of the imaging device 4 as appropriate.

Functions implemented by the processor 40 are described below. The processor 40 is programmed to operate as a communication processing unit 401, a storage processing unit 402, a detection unit 403, and a determination unit 404. These operational units may also be referred to as functions, or may be expressed as components implemented by a control unit including the processor 40 and the main memory 41.

The communication processing unit 401 processes communications between the imaging device 4 and other electronic devices via the communication interface 43. The communication processing unit 401 obtains data, information, or signals from other electronic devices via the communication interface 43. The communication processing unit 401 outputs data, information, or signals from the imaging device 4 to other electronic devices via the communication interface 43. In the case where the communication processing unit 401 obtains or outputs data, information, or signals, the communication processing unit 401 may be referred to as a communication interface.

The storage processing unit 402 stores data or information in the auxiliary storage device 42. The storage processing unit 402 may also store data or information in the main memory 41.

The detection unit 403 detects an object based on data of an image captured after item registration for a transaction at the registration device 2. The object is a set of one or more things used to track the movement of the registered items 92 in a transaction. For example, the object is one or both of at least one registered item 92 in a transaction and the basket 7. The detection unit 403 detects the movement destination of the object based on data of an image captured after item registration for a transaction at the registration device 2. The movement destination is a location to which the object is moved from the area 52. For example, the movement destination is one of regions each of which is associated with one of the multiple payment devices 3.

The determination unit 404 determines a payment device 3 to which payment data is to be output based on the movement destination of an object determined based on the captured image data.

Examples of Operations

Examples of operations of the data processing system S configured as described above are described below. The server 1 and the registration device 2-1, the payment device 3-1, the payment device 3-2, and the imaging device 4-1 illustrated in FIGS. 2 and 3 are used in the descriptions of examples of operations of the data processing system S. The processes described below are just examples and may be modified as necessary. Also, steps in the processes described below may be omitted or replaced and steps may be added to the processes to suit various embodiments.

First Operation Example

Figure 8:
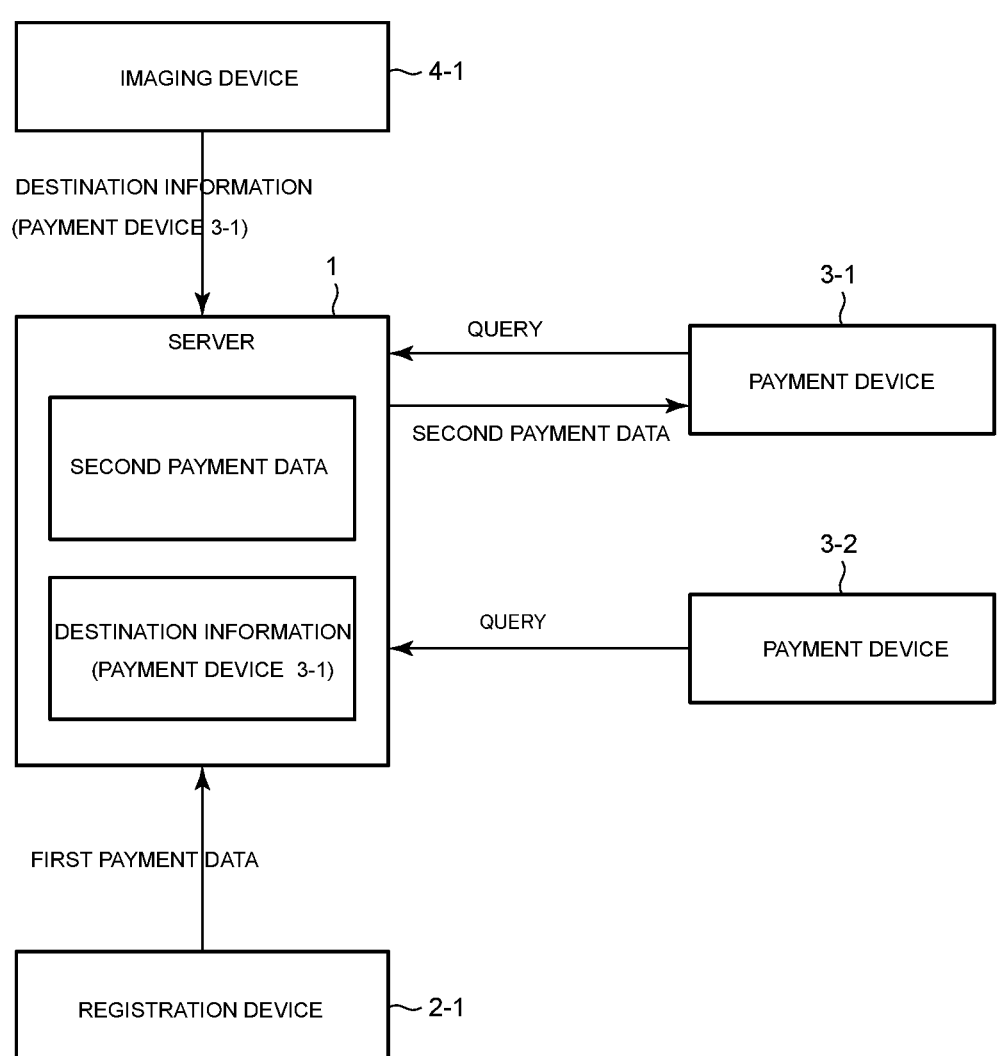
FIG. 8 is a diagram for describing a first operation example of a data processing system according to an embodiment.

A first operation example is described below. In the first operation example, the server 1 stores payment data and destination information. FIG. 8 is a diagram for describing the first operation example of the data processing system S.

The registration device 2-1 generates the first payment data based on item registration for a transaction of the customer UB. The registration device 2-1 outputs the first payment data to the server 1.

The imaging device 4-1 detects an object based on data of an image captured after the item registration for the transaction at the registration device 2. The imaging device 4-1 detects the movement of the object based on the captured image data. The imaging device 4-1 detects the movement destination of the object based on the captured image data. The imaging device 4-1 determines a payment device 3 to which the second payment data is to be output according to the movement destination of the object detected based on the captured image data. In this example, it is assumed that the clerk UA has moved some or all of the registered items 92 in the transaction from the area 52 of the table 5 to the table 8-1 after the item registration for the transaction. When some or all of the registered items 92 in the transaction are placed in the basket 7, the clerk UA moves the basket 7 carrying some or all of the registered items 92 in the transaction from the area 52 to the table 8-1. When some or all of the registered items 92 in the transaction are not placed in the basket 7, the clerk UA moves some or all of the registered items 92 in the transaction from the area 52 to the table 8-1 without using the basket 7. In this example, it is assumed that the imaging device 4-1 has determined the payment device 3-1, which is among the payment device 3-1 and the payment device 3-2 and associated with the table 8-1, as an output destination. The imaging device 4-1 outputs, to the server 1, destination information that indicates the payment device 3-1 as the output destination.

The server 1 obtains the first payment data from the registration device 2-1. After obtaining the first payment data, the server 1 stores the second payment data based on the first payment data in the auxiliary storage device 12. The server 1 obtains the destination information from the imaging device 4-1. After obtaining the destination information, the server 1 stores the destination information in the auxiliary storage device 12.

The server 1 periodically and repeatedly obtains a query from each of the payment device 3-1 and the payment device 3-2. The query is a signal used to confirm whether payment data to be output to the payment device 3 is present. In other words, the query is a signal used to request payment data directed to the payment device 3 when the payment data directed to the payment device 3 is present. Based on the query from the payment device 3-1, which is determined as the output destination, to the server 1, the server 1 outputs the second payment data to the payment device 3-1 . In this case, the server 1 does not output the second payment data to the payment device 3-2 even when a query from the payment device 3-2 to the server 1 is received.

Figure 9:
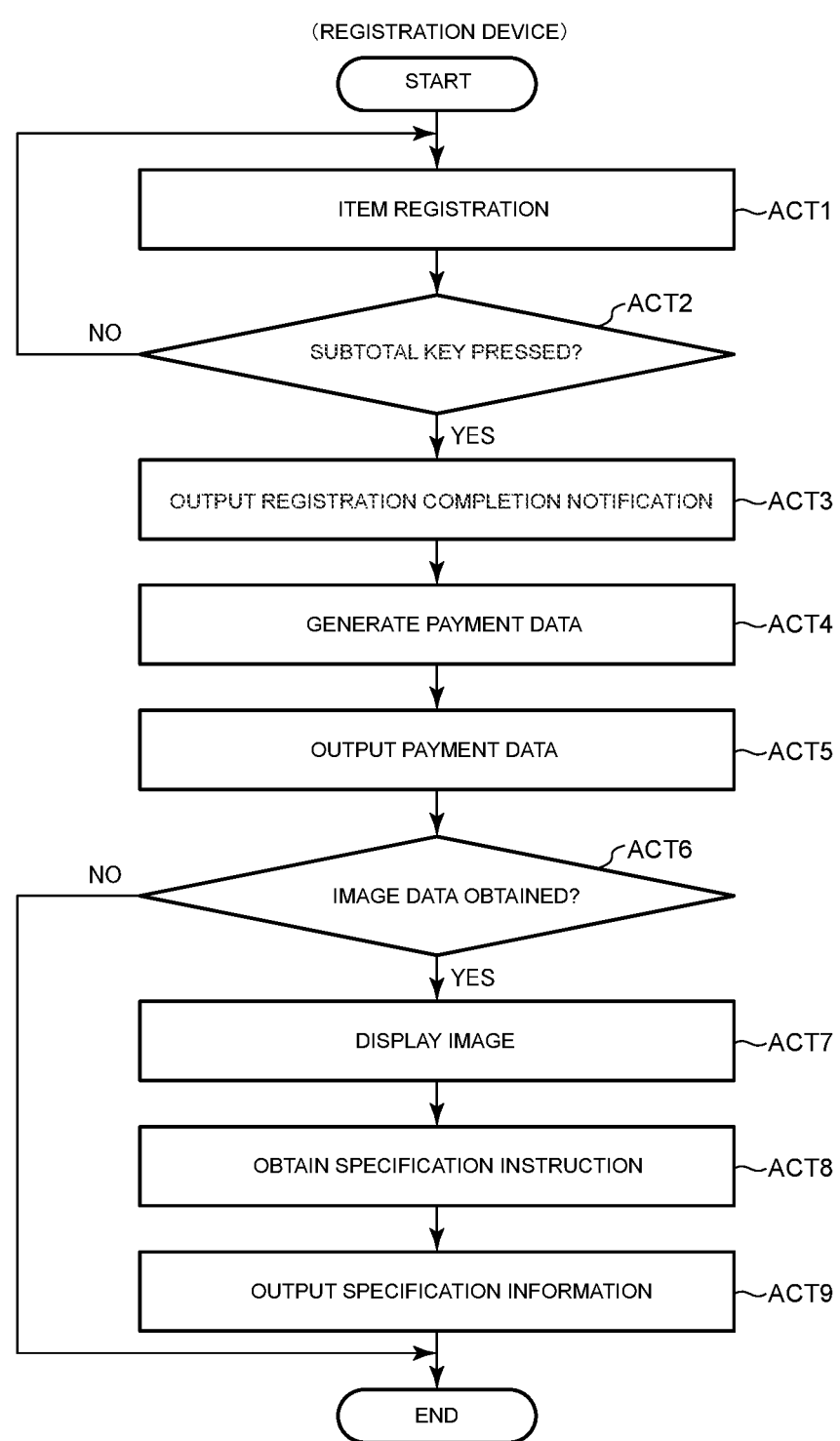
FIG. 9 is a flowchart illustrating a process performed by a processor of a registration device in the first operation example according to an embodiment.

A process performed by the registration device 2-1 in the first operation example is described below. FIG. 9 is a flowchart illustrating a process performed by the processor 20 of the registration device 2-1 in the first operation example.

The registration processing unit 202 registers an item in a transaction based on an item registration operation performed by the clerk UA using the scanner 24 or the input device 25 (ACT 1). In ACT 1, for example, the registration processing unit 202 obtains item data from the auxiliary storage device 22 or the server 1 based on a code that identifies the item and is input using the scanner 24 or the input device 25. The registration processing unit 202 registers the item data in the main memory 21 or the auxiliary storage device 22.

The registration processing unit 202 determines whether a subtotal key has been pressed by the clerk UA using the input device 25 (ACT 2). The subtotal key is used to input an instruction to end item registration for a transaction and to calculate the billing amount of the transaction. Pressing the subtotal key is an example of inputting an instruction to end item registration for a transaction. When the subtotal key has not been pressed at the registration device 2-1 (NO in ACT 2), the registration processing unit 202 continues ACT 1. When the subtotal key has been pressed at the registration device 2-1 (YES in ACT 2), the process proceeds from ACT 2 to ACT 3.

When the subtotal key has been pressed at the registration device 2-1, the communication processing unit 201 outputs a registration completion notification from the registration device 2-1 to the imaging device 4-1 (ACT 3). The registration completion notification indicates an end of item registration for a transaction at the registration device 2-1. For example, the registration completion notification is a notification indicating that the subtotal key has been pressed at the registration device 2-1. The notification may also be referred to as a signal.

When the subtotal key has been pressed at the registration device 2-1, the registration processing unit 202 generates the first payment data based on the item registration for the transaction of the customer UB (ACT 4). In ACT 4, for example, the registration processing unit 202 generates the first payment data based on the item data for each registered item 92 in the transaction.

When the subtotal key has been pressed at the registration device 2-1, the communication processing unit 201 outputs the first payment data from the registration device 2-1 to the server 1 (ACT 5).

The communication processing unit 201 determines whether image data has been obtained from the imaging device 4-1 (ACT 6). The image data indicates the registered items 92 in the transaction and is based on captured image data. The image data may be the same as the captured image data or may be obtained by extracting an area including the registered items 92 in the transaction from the captured image data. The image data may be either a static image or a video. As non-limiting example, the image data may be captured after the subtotal key is pressed at the registration device 2-1. Alternatively, the image data may be captured before the subtotal key is pressed at the registration device 2-1. As described later, when the basket 7 is not detected based on the captured image data, the imaging device 4-1 outputs the image data to the registration device 2-1. In contrast, when the basket 7 is detected based on the captured image data, the imaging device 4-1 does not output the image data to the registration device 2-1. When the image data has not been obtained by the communication processing unit 201 from the imaging device 4-1 (NO in ACT 6), the process ends. When the image data has been obtained by the communication processing unit 201 from the imaging device 4-1 (YES in ACT 6), the process proceeds from ACT 6 to ACT 7.

The display processing unit 204 displays an image on the display device 26 based on the image data obtained by the communication processing unit 201 (ACT 7). The display device 26 displays an image including registered items in a transaction based on the captured image data.

The acquisition unit 205 obtains a specification instruction input based on a specification operation performed on the image displayed on the display device 26 (ACT 8). The specification operation is performed by the clerk UA using the input device 25 to specify a detection target in the image. The detection target is at least one registered item 92 in the transaction and is to be detected by the detection unit 403 as an object. The detection target may be at least one registered item 92 included in the image. The detection target may also be a region in the image in which the detection unit 403 detects at least one registered item 92. The specification instruction specifies a detection target.

The communication processing unit 201 outputs specification information from the registration device 2-1 to the imaging device 4-1 based on the specification instruction received by the acquisition unit 205 (ACT 9). The specification information indicates the detection target specified by the specification instruction.

Figure 10:
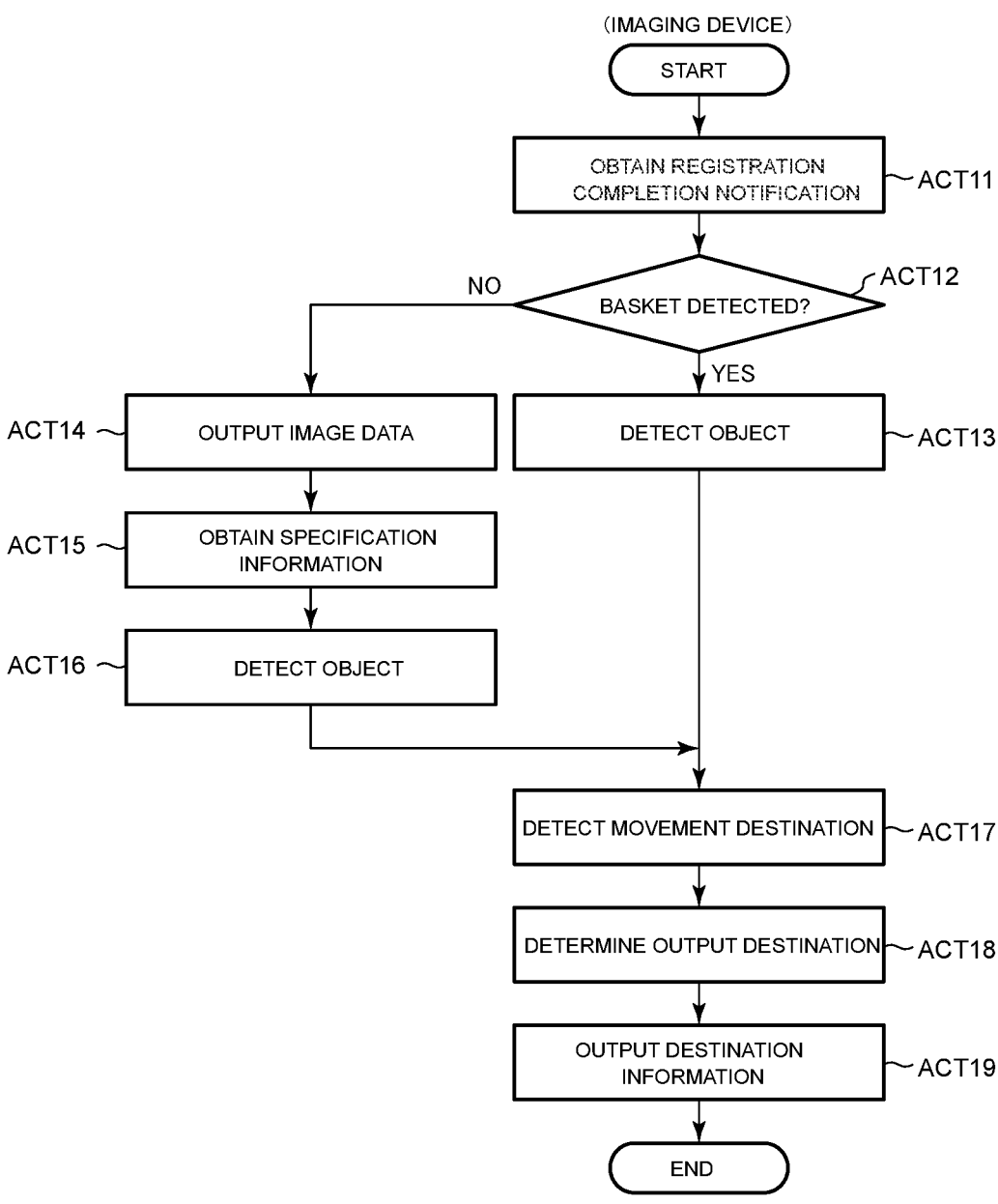
FIG. 10 is a flowchart illustrating a process performed by a processor of an imaging device in the first operation example according to an embodiment.

A process performed by the imaging device 4-1 in the first operation example is described below. FIG. 10 is a flowchart illustrating a process performed by the processor 40 of the imaging device 4-1 in the first operation example.

The communication processing unit 401 obtains the registration completion notification from the registration device 2-1 (ACT 11).

The detection unit 403 detects the basket 7 based on the captured image data (ACT 12). In ACT 12, for example, the detection unit 403 detects the basket 7 using a known image recognition technology when the registration completion notification is received by the communication processing unit 401. That is, the detection unit 403 detects the basket 7 based on the captured image data obtained after the subtotal key is pressed at the registration device 2-1. The detection unit 403 may also detect the basket 7 based on the captured image data obtained before the subtotal key is pressed at the registration device 2-1. When at least one basket 7 is placed in the area 52 on the table 5, the detection unit 403 detects the basket 7 based on the captured image data. When the basket 7 is detected by the detection unit 403 based on the captured image data (YES in ACT 12), the process proceeds from ACT 12 to ACT 13. When no basket 7 is placed in the area 52 on the table 5, no basket 7 is detected by the detection unit 403 based on the captured image data. When the basket 7 is not detected by the detection unit 403 based on the shot data (NO in ACT 12), the process proceeds from ACT 12 to ACT 14.

The detection unit 403 detects an object based on the captured image data after the item registration for the transaction at the registration device 2-1 (ACT 13). In ACT 13, for example, when the basket 7 is detected based on the captured image data, the detection unit 403 detects at least the basket 7 as an object. The detection unit 403 may detect one basket 7 as the object. Also, the detection unit 403 may detect multiple baskets 7 as the object. Also, the detection unit 403 may detect the basket 7 and the registered item 92 placed in the basket 7 as the object. Furthermore, the detection unit 403 may detect the basket 7 and the registered item 92 not placed in the basket 7 as the object.

The communication processing unit 401 outputs the image data from the imaging device 4-1 to the registration device 2-1 (ACT 14).

The communication processing unit 401 obtains the specification information from the registration device 2-1 as a response to the image data (ACT 15).

The detection unit 403 detects an object based on the captured image data after the item registration for the transaction at the registration device 2-1 (ACT 16). In ACT 16, for example, when the basket 7 is not detected based on the captured image data, the detection unit 403 detects at least one registered item 92 in the transaction as an object. In this example, the detection unit 403 can detect at least one registered item as the object based on the specification operation performed on the image displayed on the display device 26 of the registration device 2-1. When the detection target indicated by the specification information is at least one registered item 92, the detection unit 403 detects the at least one registered item 92 as the object. When the detection target indicated by the specification information is a region in the image, the detection unit 403 detects at least one registered item 92 included in the region in the image as the object.

The detection unit 403 detects a movement destination of the object based on the captured image data (ACT 17). In ACT 17, for example, the detection unit 403 detects a region in which the object moved from the area 52 is present from among the regions that are associated with the payment device 3-1 and the payment device 3-2 in the device relationship data. The detection unit 403 detects one of the regions associated with the payment device 3-1 and the payment device 3-2 as the movement destination of the object.

The determination unit 404 determines a destination payment device 3 to which the second payment data is to be output based on the movement destination of the object detected by the detection unit 403 based on the captured image data (ACT 18). In ACT 18, for example, the determination unit 404 determines, as the destination payment device 3, one of the payment devices 3 that is associated with the region detected as the movement destination by the detection unit 403 based on the device relationship data. The determination unit 404 determines the destination payment device 3 when the registration completion notification is received by the communication processing unit 401. That is, the determination unit 404 determines the destination payment device 3 based on the movement destination of the object detected after the subtotal key is pressed at the registration device 2-1. In this example, it is assumed that the payment device 3-1 is the destination payment device 3 to which the second payment data is to be output.

When the payment device 3-1 is determined as the destination payment device 3 by the determination unit 404, the communication processing unit 401 outputs destination information indicating the payment device 3-1 from the imaging device 4-1 to the server 1 (ACT 19).

Figure 11:
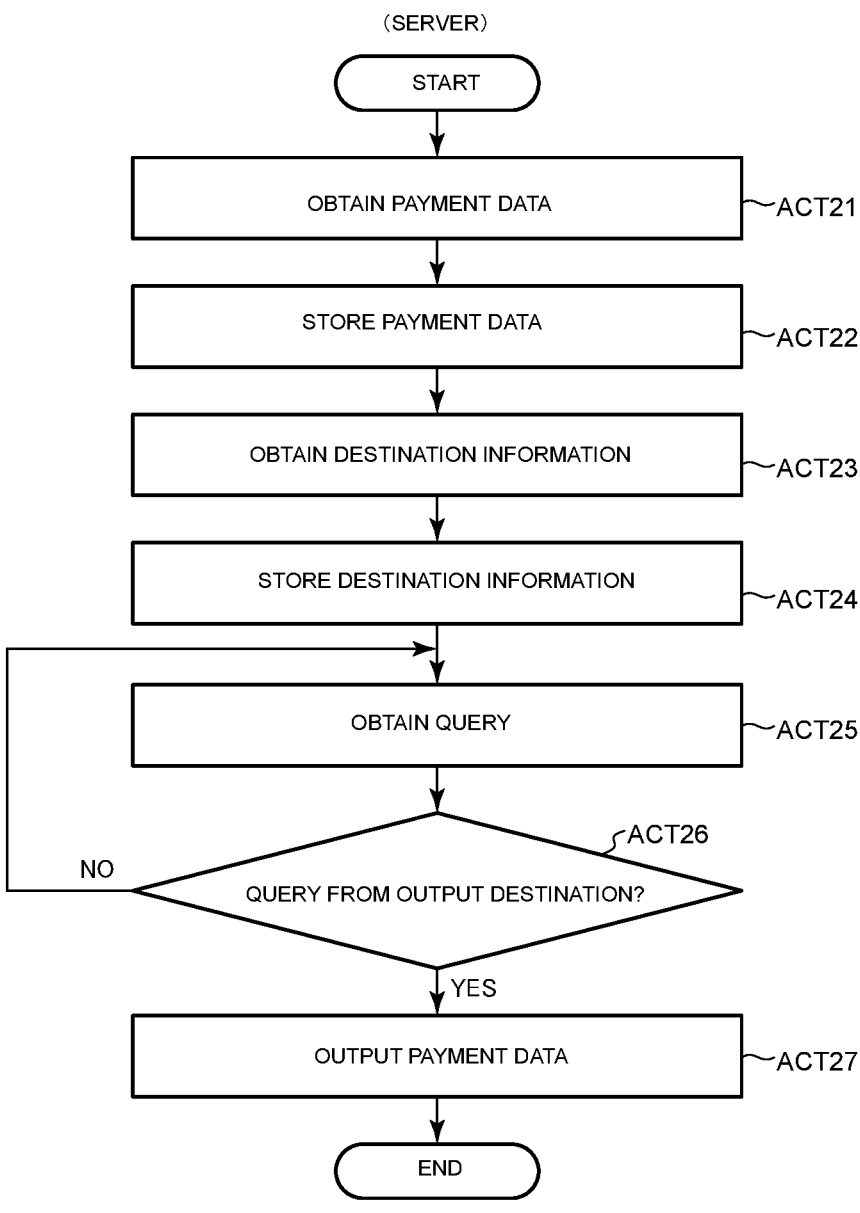
FIG. 11 is a flowchart illustrating a process performed by a processor of a server in the first operation example according to an embodiment.

A process performed by the server 1 in the first operation example is described below. FIG. 11 is a flowchart illustrating a process performed by the processor 10 of the server 1 in the first operation example.

The communication processing unit 101 obtains the first payment data from the registration device 2-1 (ACT 21).

The storage processing unit 102 stores the second payment data in the auxiliary storage device 12 of the server 1 (ACT 22). In ACT 22, for example, the storage processing unit 102 stores the second payment data in the auxiliary storage device 12 based on the first payment data. The storage processing unit 102 may store, in the auxiliary storage device 12, the second payment data that is the same as the first payment data. Also, the storage processing unit

102 may store, in the auxiliary storage device 12, the second payment data generated based on the first payment data.

As described above, the registration device 2-1 outputs the first payment data to the server 1 when the subtotal key is pressed at the registration device 2-1. The storage processing unit 102 stores the second payment data in the auxiliary storage device 12 when the first payment data is obtained by the communication processing unit 101. That is, the storage processing unit 102 stores the second payment data in the auxiliary storage device 12 when the subtotal key is pressed at the registration device 2-1. The storage processing unit 102 may also store the second payment data in the main memory 11.

The communication processing unit 101 obtains the destination information from the imaging device 4-1 (ACT 23).

The storage processing unit 102 stores the destination information in the auxiliary storage device 12 (ACT 24). As described above, the imaging device 4-1 outputs the destination information to the server 1 when the destination payment device 3 is determined by the determination unit 404. The storage processing unit 102 stores the destination information in the auxiliary storage device 12 when the destination information is obtained by the communication processing unit 101. That is, the storage processing unit 102 stores the destination information in the auxiliary storage device 12 when the destination payment device 3 is determined by the determination unit 404. The storage processing unit 102 may also store the destination information in the main memory 11.

The communication processing unit 101 obtains a query sent from each of the payment device 3-1 and the payment device 3-2 to the server 1 (ACT 25).

Based on the destination information, the communication processing unit 101 determines whether the query is from the destination payment device 3 (ACT 26). In this example, the payment device 3-1 is determined as the destination payment device 3 and is referred to as the destination payment device 3-1. When the query is not from the destination payment device 3-1 (NO in ACT 26), the communication processing unit 101 continues ACT 25. When the query is from the destination payment device 3-1 (YES in ACT 26), the process proceeds from ACT 26 to ACT 27.

In response to the query from the destination payment device 3-1 to the server 1, the communication processing unit 101 outputs the second payment data from the server 1 to the destination payment device 3-1 (ACT 27). Here, the second payment data is output after the movement destination of the object is detected. That is, the communication processing unit 101 outputs the second payment data stored in the auxiliary storage device 12 to the payment device 3-1 corresponding to the movement destination of the object when the movement destination of the object is detected by the detection unit 403. Here, the second payment data is output after the destination information is stored. That is, the communication processing unit 101 outputs the second payment data from the server 1 to the destination payment device 3-1 in response to the query sent from the destination payment device 3-1 to the server 1 after the destination information is stored in the auxiliary storage device 12 by the storage processing unit 102.

Figure 12:
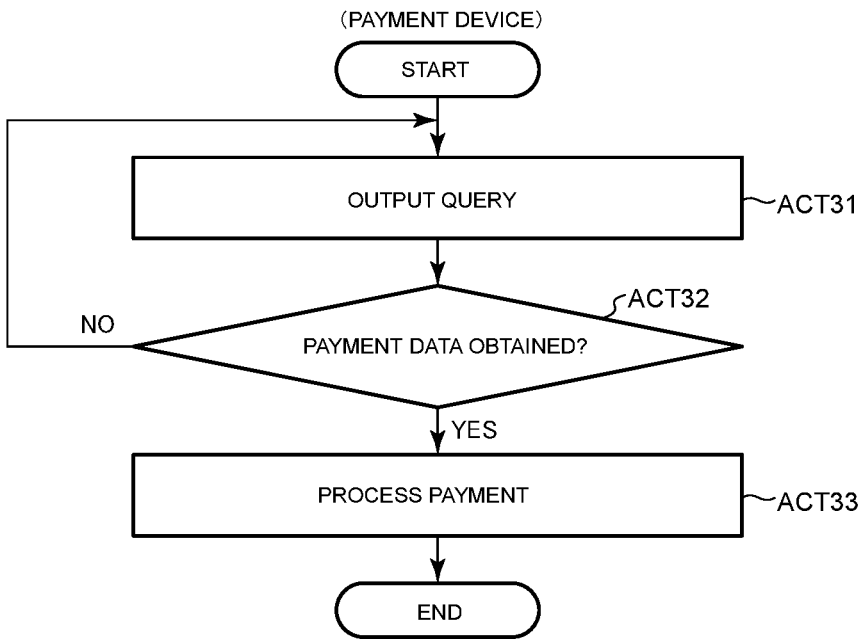
FIG. 12 is a flowchart illustrating a process performed by a processor of a payment device in the first operation example according to an embodiment.

A process performed by the payment device 3-1 in the first operation example is described below. FIG. 12 is a flowchart illustrating a process performed by the processor 30 of the payment device 3-1 in the first operation example.

The communication processing unit 301 periodically and repeatedly outputs a query from the payment device 3-1 to the server 1 (ACT 31).

The communication processing unit 301 obtains the second payment data from the server 1 as a response to the query (ACT 32). When the second payment data is not obtained by the communication processing unit 301 from the server 1 (NO in ACT 32), the communication processing unit 301 continues ACT 31. When the second payment data is obtained by the communication processing unit 301 from the server 1 (YES in ACT 32), the process proceeds from ACT 32 to ACT 33.

The payment processing unit 302 processes the payment of the transaction based on the second payment data (ACT 33). In ACT 33, for example, the payment processing unit 302 processes the payment of the transaction based on the second payment data according to a payment method selected by the customer UB using the input device 38. Here, when the second payment data is a code for uniquely identifying the transaction, the communication processing unit 301 obtains, from the server 1 via the network NW, data necessary for the payment based on the second payment data.

Because the process performed by the payment device 3-2 in the first operation example is substantially the same as the process performed by the payment device 3-1 in the first operation example, descriptions of the process performed by the payment device 3-2 are omitted.

Example of Displayed Image

Figure 13:
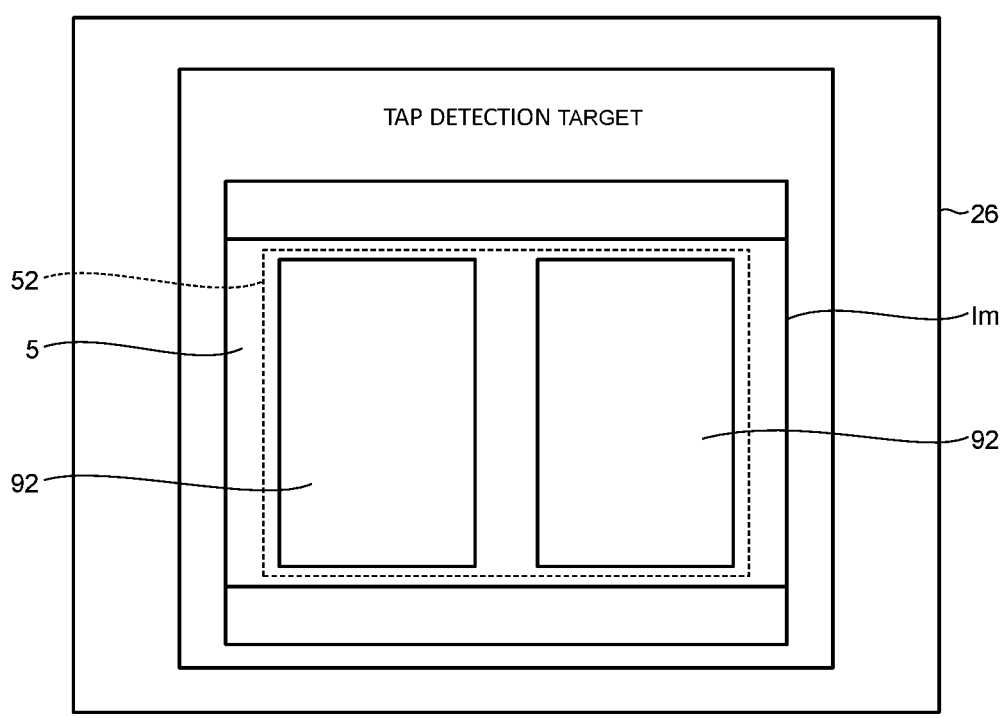
FIG. 13 is a diagram illustrating an image displayed on a display device of a registration device according to an embodiment.

An example of an image displayed on the display device 26 of the registration device 2-1 is described below. FIG. 13 illustrates an image Im displayed on the display device 26 of the registration device 2-1. The image Im shows two registered items 92 in a transaction that are placed in the area 52 on the table 5. The basket 7 is not placed in the area 52 on the table 5. The clerk UA specifies a detection target in the image Im by, for example, touching the image Im. The clerk UA may specify, as a detection target, at least one registered item 92 or a region in the image Im.

In the first operation example, the processor 10 of the server 1 may implement a detection unit and a determination unit similar to the detection unit 403 and the determination unit 404. In this example, the communication processing unit 101 may obtain captured image data from the imaging device 4-1.

In the first operation example, the data processing system S may include the server 1 including at least the communication processing unit 101 and the imaging device 4-1 including at least the detection unit 403. The data processing system S may include the server 1 including at least the communication processing unit 101 and the detection unit.

Variation of First Operation Example

A variation of the first operation example is described below. In the first operation example described above, the imaging device 4-1 outputs image data to the registration device 2-1 when the basket 7 is not detected. However, the present disclosure is not limited to this example. The imaging device 4-1 may be configured to not output image data to the registration device 2-1 even when the basket 7 is not detected. In this case, ACT 6 through ACT 9 performed by the processor 20 of the registration device 2-1 in FIG. 9 are omitted. Also, in this case, ACT 14 and ACT 15 performed by the processor 40 of the imaging device 4-1 in FIG. 10 are omitted. In ACT 16, for example, when the basket 7 is not detected based on the captured image data, the detection unit 403 detects at least one registered item 92 in the transaction as an object based on the captured image data by using a known image recognition technology. With this configuration, because the data processing system S does not require the clerk UA to perform a specification operation, the workload of the clerk UA can be reduced.

The imaging device 4-1 may output image data to the registration device 2-1 regardless of whether the basket 7 is detected. In this case, ACT 12 and ACT 13 performed by the processor 40 of the imaging device 4-1 in FIG. 10 are omitted. In ACT 14, the communication processing unit 401 outputs the image data from the imaging device 4-1 to the registration device 2-1 when the registration completion notification is received.

In the first operation example, when the basket 7 is detected, the imaging device 4-1 detects at least the basket 7 as the object. However, the present disclosure is not limited to this example. The imaging device 4-1 may detect at least one registered item 92 in the transaction as the object based on the captured image data by using a known image recognition technology regardless of whether the basket 7 is detected. In this case, ACT 6 through ACT 9 performed by the processor 20 of the registration device 2-1 in FIG. 9 are omitted. Also, in this case, ACT 12 through ACT 15 performed by the processor 40 of the imaging device 4-1 in FIG. 10 are omitted. In ACT 16, for example, the detection unit 403 detects at least one registered item 92 in the transaction as the object based on the captured image data when the registration completion notification is received.

In the first operation example described above, the server 1 outputs the second payment data to the destination payment device 3-1 in response to a query from the destination payment device 3-1 to the server 1. However, the present disclosure is not limited to this example. The server 1 may output the second payment data to the destination payment device 3-1 without requiring the query from the destination payment device 3-1 to the server 1. In this case, ACT 25 and ACT 26 performed by the processor 10 of the server 1 in FIG. 11 are omitted. In ACT 27, the communication processing unit 101 outputs the second payment data from the server 1 to the destination payment device 3-1 based on the destination information. Also, in this case, ACT 31 performed by the processor 30 of the payment device 3-1 in FIG. 12 is omitted.

In ACT 32, the communication processing unit 301 obtains the second payment data from the server 1 without outputting a query to the server 1.

Second Operation Example

Figure 14:
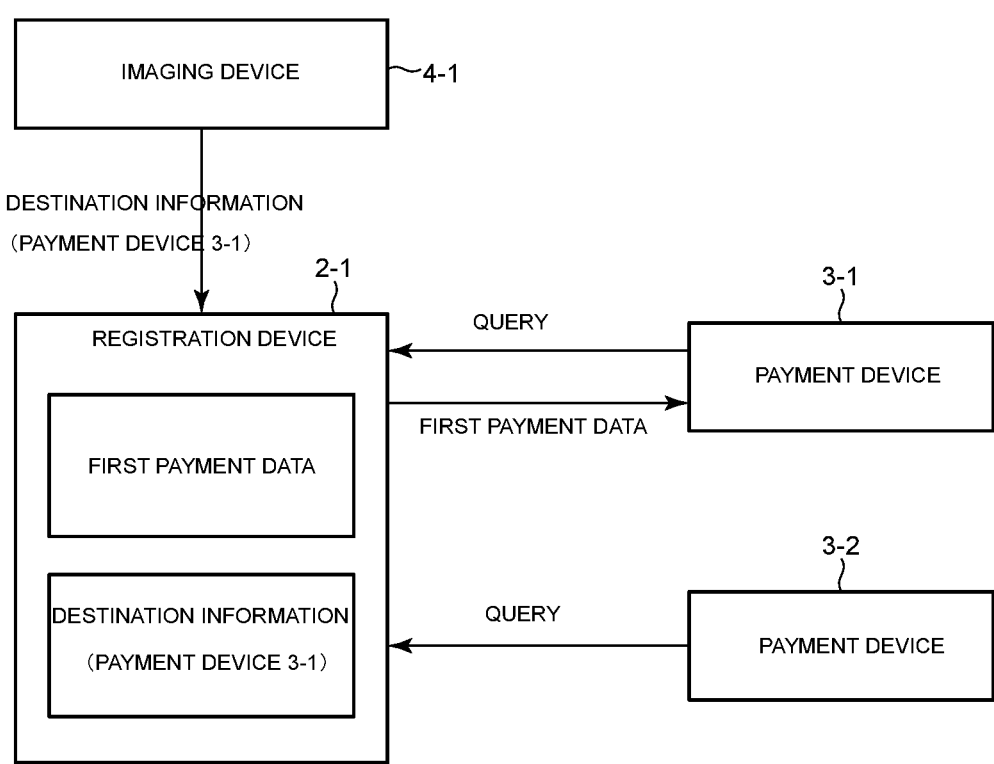
FIG. 14 is a diagram for describing a second operation example of a data processing system according to an embodiment.

A second operation example is described below. In the second operation example, the registration device 2-1 stores payment data and destination information. FIG. 14 is a diagram for describing the second operation example of the data processing system S.

The imaging device 4-1 detects an object based on captured image data after item registration for a transaction at the registration device 2. The imaging device 4-1 detects the movement of the object based on captured image data. The imaging device 4-1 detects the movement destination of the object based on captured image data. The imaging device 4-1 determines a payment device 3 to which the second payment data is to be output according to the movement destination of the object detected based on the captured image data. Here, it is assumed that the imaging device 4-1 has determined the payment device 3-1, which is among the payment device 3-1 and the payment device 3-2 and associated with the table 8-1, as an output destination. The imaging device 4-1 outputs, to the server 1, destination information that indicates the payment device 3-1 as the output destination.

The registration device 2-1 generates the first payment data based on item registration for a transaction of the customer UB. The registration device 2-1 stores the first payment data in the auxiliary storage device 22. The registration device 2-1 obtains the destination information from the imaging device 4-1. When obtaining the destination information, the registration device 2-1 stores the destination information in the auxiliary storage device 22.

The registration device 2-1 periodically and repeatedly obtains a query from each of the payment device 3-1 and the payment device 3-2. In response to the query sent from the payment device 3-1, which is determined as the output destination, to the registration device 2-1, the registration device 2-1 outputs the first payment data to the payment device 3-1. In this example, the registration device 2-1 does not output the first payment data to the payment device 3-2 even when the query from the payment device 3-2 to the registration device 2-1 is received.

Figure 15:
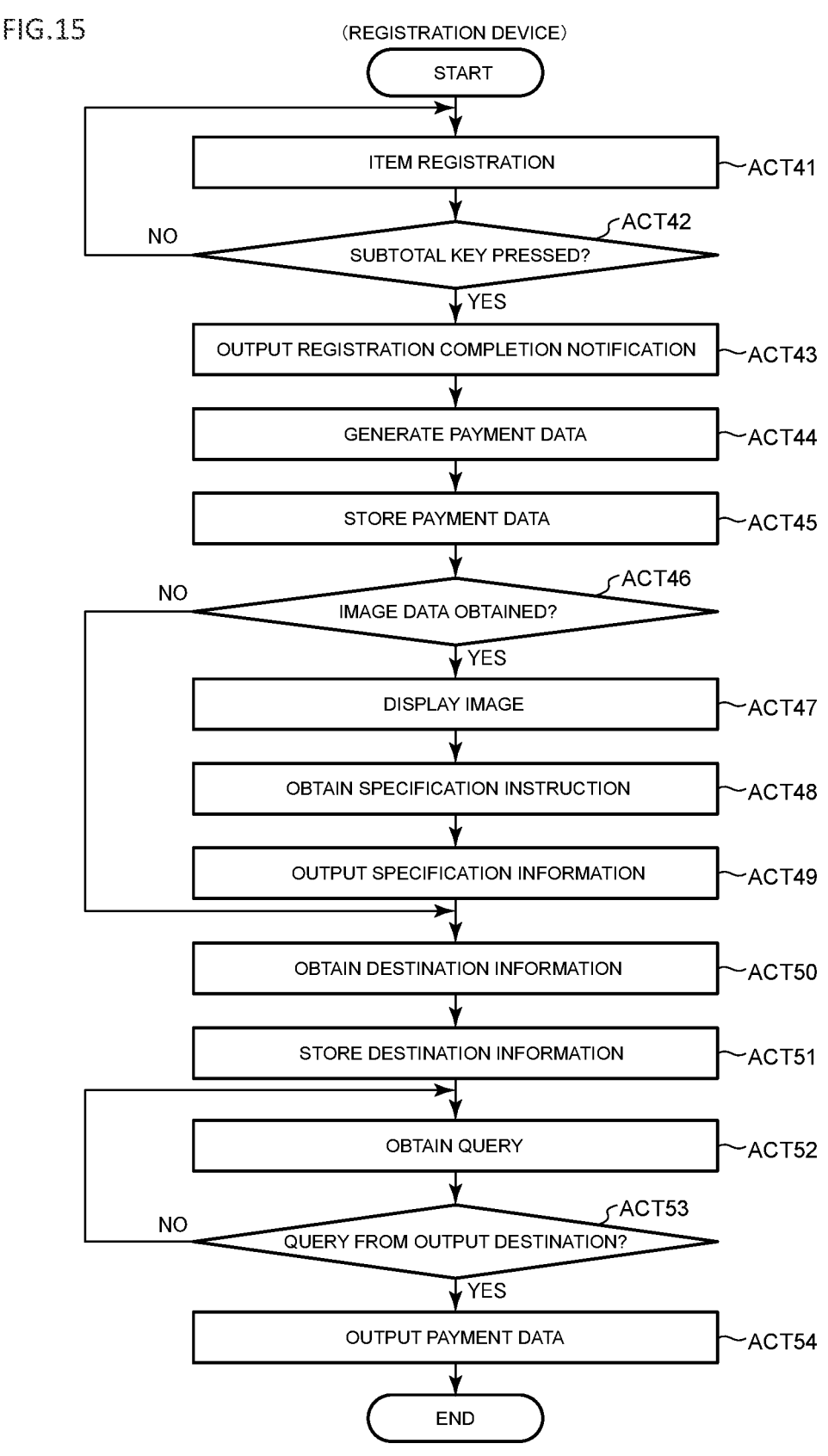
FIG. 15 is a flowchart illustrating a process performed by a processor of a registration device in the second operation example according to an embodiment.

A process performed by the registration device 2-1 in the second operation example is described below. FIG. 15 is a flowchart illustrating a process performed by the processor 20 of the registration device 2-1 in the second operation example.

The registration processing unit 202 registers an item in a transaction based on an item registration operation performed by the clerk UA using the scanner 24 or the input device 25 (ACT 41). ACT 41 is substantially the same as ACT 1 described above.

The registration processing unit 202 determines whether the subtotal key has been pressed by the clerk UA using the input device 25 (ACT 42). ACT 42 is substantially the same as ACT 2 described above. When the subtotal key has not been pressed at the registration device 2-1 (NO in ACT 42), the registration processing unit 202 continues ACT 41. When the subtotal key has been pressed at the registration device 2-1 (YES in ACT 42), the process proceeds from ACT 42 to ACT 43.

When the subtotal key has been pressed at the registration device 2-1, the communication processing unit 201 outputs a registration completion notification from the registration device 2-1 to the imaging device 4-1 (ACT 43). ACT 43 is substantially the same as ACT 3 described above.

When the subtotal key has been pressed at the registration device 2-1, the registration processing unit 202 generates the first payment data based on the item registration for the transaction of the customer UB (ACT 44). ACT 44 is substantially the same as ACT 4 described above.

When the subtotal key has been pressed at the registration device 2-1, the storage processing unit 203 stores the first payment data in the auxiliary storage device 22 (ACT 45). The storage processing unit 203 may also store the first payment data in the main memory 21.

The communication processing unit 201 determines whether image data has been obtained from the imaging device 4-1 (ACT 46). ACT 46 is substantially the same as ACT 6 described above. When the image data has not been obtained by the communication processing unit 201 from the imaging device 4-1 (NO in ACT 46), the process proceeds from ACT 46 to ACT 50. When the image data has been obtained by the communication processing unit 201 from the imaging device 4-1 (YES in ACT 46), the process proceeds from ACT 46 to ACT 47.

The display processing unit 204 displays an image on the display device 26 based on the image data obtained by the communication processing unit 201 (ACT 47). ACT 47 is substantially the same as ACT 7 described above.

The acquisition unit 205 obtains a specification instruction that is input based on a specification operation performed on the image displayed on the display device 26 (ACT 48). ACT 48 is substantially the same as ACT 8 described above.

The communication processing unit 201 outputs specification information from the registration device 2-1 to the imaging device 4-1 based on the specification instruction received by the acquisition unit 205 (ACT 49). ACT 49 is substantially the same as ACT 9 described above.

The communication processing unit 201 obtains destination information from the imaging device 4-1 (ACT 50).

The storage processing unit 203 stores the destination information in the auxiliary storage device 22 (ACT 51). When a destination payment device 3 is determined by the determination unit 404, the imaging device 4-1 outputs the destination information to the registration device 2-1. The storage processing unit 203 stores the destination information in the auxiliary storage device 22 when the destination information is obtained by the communication processing unit 201. That is, the storage processing unit 203 stores the destination information in the auxiliary storage device 22 when the destination payment device 3 is determined by the determination unit 404. The storage processing unit 203 may also store the destination information in the main memory 21.

The communication processing unit 201 obtains a query sent from each of the payment device 3-1 and the payment device 3-2 to the registration device 2-1 (ACT 52).

Based on the destination information, the communication processing unit 201 determines whether the query is from the destination payment device 3 (ACT 53). In this example, the payment device 3-1 is determined as the destination payment device 3 and is referred to as the destination payment device 3-1. When the query is not from the destination payment device 3-1 (NO in ACT 53), the communication processing unit 201 continues ACT 52. When the query is from the destination payment device 3-1 (YES in ACT 53), the process proceeds from ACT 53 to ACT 54.

In response to the query from the destination payment device 3-1 to the registration device 2-1, the communication processing unit 201 outputs the first payment data from the registration device 2-1 to the destination payment device 3-1 (ACT 54). Here, the first payment data is output after the destination information is stored. That is, the communication processing unit 201 outputs the first payment data from the registration device 2-1 to the destination payment device 3-1 in response to the query sent from the destination payment device 3-1 to the registration device 2-1 after the destination information is stored in the auxiliary storage device 22 by the storage processing unit 203.

A process performed by the imaging device 4-1 in the second operation example is described below. The process performed by the imaging device 4-1 in the second operation example is substantially the same as the process performed by the imaging device 4-1 in the first operation example, which is described with reference to the flowchart of FIG. 10, except for the points described below. In ACT 18, while the determination unit 404 determines a payment device 3 to which the second payment data is output in the first operation example, the determination unit 404 determines a payment device 3 to which the first payment data is output in the second operation example. In ACT 19, while the communication processing unit 401 outputs the destination information to the server 1 in the first operation example, the communication processing unit 401 outputs the destination information to the registration device 2-1 in the second operation example.

A process performed by the payment device 3-1 in the second operation example is described below. The process performed by the payment device 3-1 in the second operation example is substantially the same as the process performed by the payment device 3-1 in the first operation example, which is described with reference to the flowchart of FIG. 12, except for the points described below. In ACT 31, while the communication processing unit 301 outputs the query to the server 1 in the first operation example, the communication processing unit 301 outputs the query to the registration device 2-1 in the second operation example. Here, in the second operation example, based on communication destination information stored in the auxiliary storage device 32, the communication processing unit 301 can determine, from among the multiple registration devices 2, the registration device 2-1 with which the payment device 3-1 communicates. In ACT 32, while the communication processing unit 301 obtains the second payment data from the server 1 in the first operation example, the communication processing unit 301 obtains the first payment data from the registration device 2-1 in the second operation example. In ACT 33, while the payment processing unit 302 processes the payment of a transaction based on the second payment data in the first operation example, the payment processing unit 302 processes the payment of a transaction based on the first payment data in the second operation example.

Because the process performed by the payment device 3-2 in the second operation example is substantially the same as the process performed by the payment device 3-1 in the second operation example, descriptions of the process performed by the payment device 3-2 are omitted.

In the second operation example, the processor 20 of the registration device 2-1 may implement a detection unit and a determination unit similar to the detection unit 403 and the determination unit 404. In this example, the communication processing unit 201 may obtain captured image data from the imaging device 4-1.

In the second operation example, the data processing system S may include the registration device 2-1 including at least the communication processing unit 201 and the imaging device 4-1 including at least the detection unit 403. The data processing system S may include the registration device 2-1 including at least the communication processing unit 201 and the detection unit.

Variation of Second Operation Example

A variation of the second operation example is described below. Similarly to the variation of the first operation example, the imaging device 4-1 may be configured to not output image data to the registration device 2-1 when the basket 7 is not detected. In this case, ACT 46 through ACT 49 performed by the processor 20 of the registration device 2-1 in FIG. 15 are omitted. For example, when the basket 7 is not detected based on captured image data, the detection unit 403 of the imaging device 4-1 detects at least one registered item 92 in a transaction as an object based on the captured image data.

Similarly to the variation of the first operation example, the imaging device 4-1 may be configured to output image data to the registration device 2-1 regardless of whether the basket 7 is detected.

Similarly to the variation of the first operation example, the imaging device 4-1 may be configured to detect at least one registered item 92 in a transaction as an object based on captured image data regardless of whether the basket 7 is detected. In this case, ACT 46 through ACT 49 performed by the processor 20 of the registration device 2-1 in FIG. 15 are omitted.

In the second operation example described above, the registration device 2-1 outputs the first payment data to the destination payment device 3-1 in response to a query sent from the destination payment device 3-1 to the registration device 2-1. However, the present disclosure is not limited to this example. The registration device 2-1 may be configured to output the first payment data to the destination payment device 3-1 without requiring a query from the destination payment device 3-1 to the registration device 2-1. In this case, ACT 52 and ACT 53 performed by the processor 20 of the registration device 2-1 in FIG. 15 are omitted. In ACT 54, the communication processing unit 201 outputs the first payment data from the registration device 2-1 to the destination payment device 3-1 based on destination information. Also, in this case, ACT 31 performed by the processor 30 of the payment device 3-1 in FIG. 12 is omitted. In ACT 32, the communication processing unit 301 obtains the first payment data from the registration device 2-1 without outputting a query to the registration device 2-1.

Third Operation Example

Figure 16:
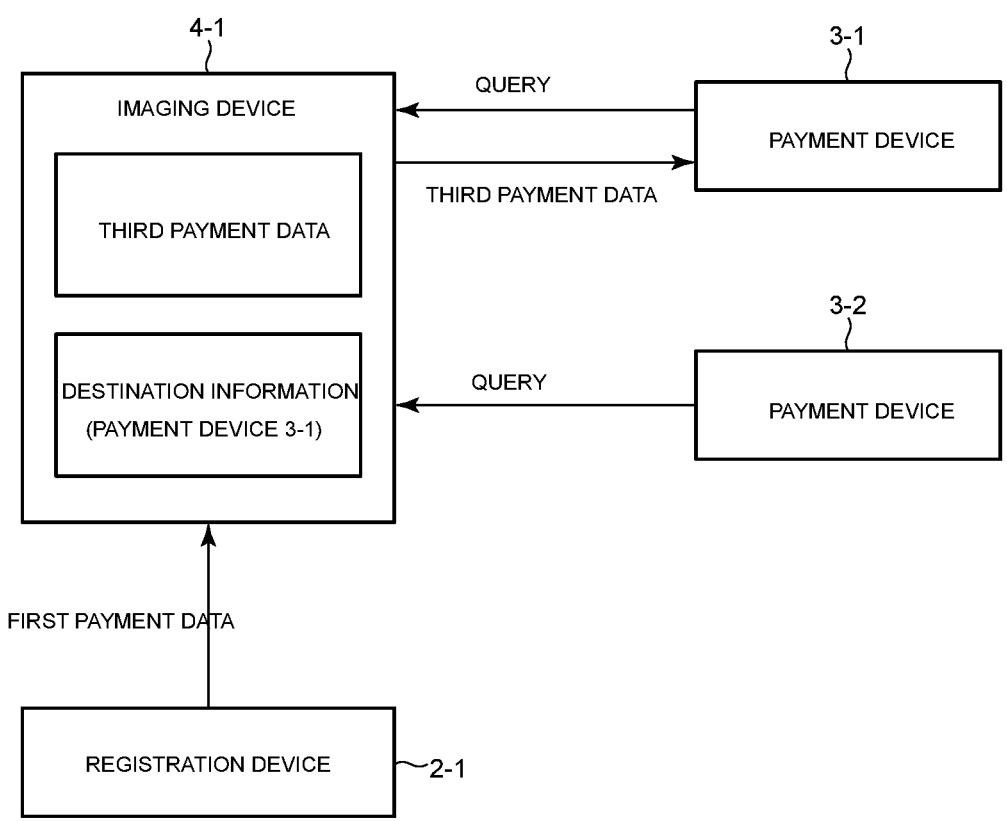
FIG. 16 is a diagram for describing a third operation example of a data processing system according to an embodiment.

A third operation example is described below. In the third operation example, the imaging device 4-1 stores payment data and destination information. FIG. 16 is a diagram for describing the third operation example of the data processing system S.

The registration device 2-1 generates the first payment data based on item registration for a transaction of the customer UB. The registration device 2-1 outputs the first payment data to the imaging device 4-1.

The imaging device 4-1 detects an object based on captured image data after the item registration for the transaction at the registration device 2. The imaging device 4-1 detects the movement of the object based on captured image data. The imaging device 4-1 detects the movement destination of the object based on captured image data. The imaging device 4-1 determines a payment device 3 to which the second payment data is to be output according to the movement destination of the object detected based on the captured image data. Here, it is assumed that the imaging device 4-1 has determined the payment device 3-1, which is among the payment device 3-1 and the payment device 3-2 and associated with the table 8-1, as an output destination, and the payment device 3-1 is referred to as the destination payment device 3-1. The imaging device 4-1 stores the destination information in the auxiliary storage device 42.

The imaging device 4-1 periodically and repeatedly obtains a query from each of the payment device 3-1 and the payment device 3-2. In response to the query from the destination payment device 3-1 to the imaging device 4-1, the imaging device 4-1 outputs the third payment data to the destination payment device 3-1. In this case, the imaging device 4-1 does not output the third payment data to the payment device 3-2 even when a query from the payment device 3-2 to the imaging device 4-1 is received.

A process performed by the registration device 2-1 in the third operation example is described below. The process performed by the registration device 2-1 in the third operation example is substantially the same as the process performed by the registration device 2-1 in the first operation example, which is described with reference to the flowchart of FIG. 9, except for the points described below. In ACT 5, while the communication processing unit 201 outputs the first payment data to the server 1 in the first operation example, the communication processing unit 201 outputs the first payment data to the imaging device 4-1 in the third operation example.

A process performed by the imaging device 4-1 in the third operation example is described below. FIG. 17 is a flowchart illustrating a process performed by the processor 40 of the imaging device 4-1 in the third operation example.

The communication processing unit 401 obtains a registration completion notification from the registration device 2-1 (ACT 61). ACT 61 is substantially the same as ACT 11 described above.

The communication processing unit 401 obtains the first payment data from the registration device 2-1 (ACT 62).

The storage processing unit 402 stores the third payment data in the auxiliary storage device 42 of the imaging device 4-1 (ACT 63). In ACT 63, for example, the storage processing unit 402 stores the third payment data in the auxiliary storage device 42 based on the second payment data. The storage processing unit 402 may store the third payment data, which is the same as the first payment data, in the auxiliary storage device 42.

As described above, the registration device 2-1 outputs the first payment data to the imaging device 4-1 when the subtotal key is pressed at the registration device 2-1. The storage processing unit 402 stores the third payment data in the auxiliary storage device 42 when the first payment data is obtained by the communication processing unit 401. That is, the storage processing unit 402 stores the third payment data in the auxiliary storage device 42 when the subtotal key is pressed at the registration device 2-1. The storage processing unit 402 may also store the third payment data in the main memory 41.

The detection unit 403 detects the basket 7 based on captured image data (ACT 64). ACT 64 is substantially the same as ACT 12 described above. When the basket 7 is detected by the detection unit 403 based on the captured image data (YES in ACT 64), the process proceeds from ACT 64 to ACT 65. When the basket 7 is not detected by the detection unit 403 based on the captured image data (NO in ACT 64), the process proceeds from ACT 64 to ACT 66.

The detection unit 403 detects an object based on the captured image data after the item registration for the transaction at the registration device 2 -1 (ACT 65). ACT 65 is substantially the same as ACT 13 described above.

The communication processing unit 401 outputs the image data from the imaging device 4-1 to the registration device 2-1 (ACT 66).

The communication processing unit 401 obtains specification information from the registration device 2-1 as a response to the image data (ACT 67).

The detection unit 403 detects an object based on the captured image data after the item registration of the transaction at the registration device 2 -1 (ACT 68). ACT 68 is substantially the same as ACT 16 described above.

The detection unit 403 detects the movement destination of the object based on captured image data (ACT 69). ACT 69 is substantially the same as ACT 17 described above.

The determination unit 404 determines a destination payment device 3 to which the second payment data is to be output based on the movement destination of the object detected by the detection unit 403 based on the captured image data (ACT 70). ACT 70 is substantially the same as ACT 18 described above.

When the destination payment device 3 is determined by the determination unit 404, the storage processing unit 402 stores, in the auxiliary storage device 42, destination information indicating the payment device 3-1 as the destination payment device 3 (ACT 71). The storage processing unit 402 may also store the destination information in the main memory 41.

The communication processing unit 401 obtains a query to the imaging device 4-1 from each of the payment device 3-1 and the payment device 3-2 (ACT 72).

The communication processing unit 401 determines whether the query is from the destination payment device 3 (in this example, the destination payment device 3-1) based on the destination information (ACT 73). When the query is not from the destination payment device 3-1 (NO in ACT 73), the communication processing unit 401 continues ACT 72. When the query is from the destination payment device 3-1 (YES in ACT 73), the process proceeds from ACT 73 to ACT 74.

The communication processing unit 401 outputs the third payment data from the imaging device 4-1 to the destination payment device 3-1 in response to the query from the destination payment device 3-1 to the imaging device 4-1 (ACT 74). Here, the third payment data is output after the destination information is stored. That is, the communication processing unit 401 outputs the third payment data from the imaging device 4-1 to the destination payment device 3-1 in response to a query that is sent from the destination payment device 3-1 to the imaging device 4-1 after the destination information is stored in the auxiliary storage device 42 by the storage processing unit 402.

A process performed by the payment device 3-1 in the third operation example is described below. The process performed by the payment device 3-1 in the third operation example is substantially the same as the process performed by the payment device 3-1 in the first operation example, which is described with reference to the flowchart of FIG. 12, except for the points described below. In ACT 31, while the communication processing unit 301 outputs the query to the server 1 in the first operation example, the communication processing unit 301 outputs the query to the imaging device 4-1 in the third operation example. In the third operation example, the communication processing unit 301 may determine the imaging device 4-1 among the multiple imaging devices 4 as a target imaging device 4, with which the payment device 3-1 communicates, based on the communication destination information stored in the auxiliary storage device 32. In ACT 32, while the communication processing unit 301 obtains the second payment data from the server 1 in the first operation example, the communication processing unit 301 obtains the third payment data from the imaging device 4-1 in the third operation example. In ACT 33, while the payment processing unit 302 processes the payment of a transaction based on the second payment data in the first operation example, the payment processing unit 302 processes the payment of a transaction based on the third payment data in the third operation example.

In the third operation example, the data processing system S may include the imaging device 4-1 including at least the communication processing unit 401 and the detection unit 403.

Variation of Third Operation Example

A variation of the third operation example is described below. Similarly to the variation of the first operation example, the imaging device 4-1 may be configured to not output image data to the registration device 2-1 when the basket 7 is not detected. In this case, ACT 66 and ACT 67 performed by the processor 40 of the imaging device 4-1 in FIG. 17 are omitted. In ACT 68, for example, when the basket 7 is not detected based on the captured image data, the detection unit 403 detects at least one registered item 92 in the transaction as an object based on the captured image data.

Similarly to the variation of the first operation example, the imaging device 4-1 may be configured to output image data to the registration device 2-1 regardless of whether the basket 7 is detected. In this case, ACT 64 and ACT 65 performed by the processor 40 of the imaging device 4-1 in FIG. 17 are omitted.

Similarly to the variation of the first operation example, the imaging device 4-1 may be configured to detect, based on captured image data, at least one registered item 92 in a transaction as an object regardless of whether the basket 7 is detected. In this case, ACT 64 through ACT 67 performed by the processor 40 of the imaging device 4-1 in FIG. 17 are omitted. In ACT 68, for example, the detection unit 403 detects, based on captured image data, at least one registered item 92 in the transaction as an object when a registration completion notification is received.

In the third operation example described above, the imaging device 4-1 outputs the third payment data to the destination payment device 3-1 in response to a query sent from the destination payment device 3-1 to the registration device 2-1. However, the present disclosure is not limited to this example. The imaging device 4-1 may output the third payment data to the destination payment device 3-1 without requiring the query from the destination payment device 3-1 to the imaging device 4-1. In this case, ACT 72 and ACT 73 performed by the processor 40 of the imaging device 4-1 in FIG. 17 are omitted. In ACT 74, the communication processing unit 401 outputs the third payment data from the imaging device 4-1 to the destination payment device 3-1 based on the destination information. Also, in this case, ACT 31 performed by the processor 30 of the payment device 3-1 in FIG. 12 is omitted. In ACT 32, the communication processing unit 301 obtains the third payment data from the imaging device 4-1 without outputting a query to the registration device 2-1.

Effects

A data processing system according to an embodiment includes a detection unit that detects a movement destination of an object based on captured image data after item registration for a transaction at a registration device. The data processing system also includes a communication processing unit that outputs data related to the transaction and stored in a storage unit to a payment device corresponding to the movement destination of the object when the movement destination of the object is detected by the detection unit.

Detecting the movement destination of the object enables the data processing system to output the data related to the transaction to the payment device corresponding to the movement destination of the object without requiring a clerk to specify the payment device. This eliminates the need for the clerk to specify a payment device used by a customer for payment by, for example, visually checking the states of multiple payment devices. Thus, the data processing system can reduce the workload of the clerk operating the registration device. Here, the object tends to be moved to a predetermined location, such as a table, near the payment device before the payment. For this reason, the data processing system is configured to detect the movement destination of the object so as to be able to properly determine a payment device to which data related to a transaction is to be output.

In the data processing system according to the embodiment, when a basket for carrying a registered item is detected based on the captured image data, the detection unit detects at least the basket as the object.

The basket for carrying the registered item tends to be moved to a predetermined location, such as a table, near the payment device before the payment. For this reason, the data processing system is configured to detect the movement destination of the basket so as to be able to properly determine a payment device to which data related to a transaction is to be output.

In the data processing system according to the embodiment, when a basket for carrying a registered item is not detected based on the captured image data, the detection unit detects at least one registered item in the transaction as the object.

Even when the basket for carrying the registered item is not used, the registered item tends to be moved to a predetermined location, such as a table, near the payment device before the payment. For this reason, the data processing system is configured to detect the movement destination of the registered item so as to be able to properly determine a payment device to which data related to a transaction is to be output.

The data processing system according to the embodiment further includes a display control unit that displays, on a display unit, an image that is based on the captured image data and includes one or more registered items in the transaction. The detection unit detects at least one of the registered items in the transaction as the object based on a specification operation performed on the image.

For example, the clerk may move at least one registered item specified on the image to a predetermined location, such as a table, near the payment device before the payment. The at least one of the registered items the movement destination of which is detected by the data processing system corresponds to the at least one registered item moved by the clerk to the predetermined location. Accordingly, the data processing system can properly determine a payment device to which data related to a transaction is to be output.

In the data processing system according to the embodiment, the image is obtained after an instruction to end the item registration for the transaction is input at the registration device.

A registered item is fixed as an item to be paid for when the item registration for the transaction is ended and therefore tends to be moved to a predetermined location, such as a table, near the payment device. For this reason, the data processing system is configured to detect the movement destination of a registered item fixed as an item to be paid for s o as to be able to properly determine the payment device to which data related to a transaction is to be output.

Other Embodiments

In the embodiment described above, the server 1 is implemented by one electronic device. However, the present disclosure is not limited to this embodiment. The server 1 may be implemented by a system including multiple electronic devices to which functions are distributed.

The embodiment described above may be applied not only to a data processing system but also to a method performed by the data processing system. The embodiment described above may also be applied to a program for causing a computer to perform processes corresponding to components of the data processing system. The embodiment described above may be applied not only to electronic devices such as a server, a registration device, a payment device, and an imaging device but also to methods performed by the electronic devices. The embodiment described above may also be applied to a program for causing a computer to perform processes corresponding to components of the electronic devices.

The data processing system may include one electronic device or multiple electronic devices. That is, components of the data processing system may be implemented by one electronic device or by multiple electronic devices.

The program may be prestored in the electronic device or may be provided separately from the electronic device. In the latter case, the program may be provided via a network or may be provided in a recording medium. The recording medium is a non-transitory tangible medium. The recording medium is an electronic-device-readable medium. The recording medium may be any type of medium, such as a CD-ROM or a memory card, that can store a program and is readable by an electronic device.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A point-of-sale (POS) system comprising:
a registration device configured to register items for a transaction;
a plurality of payment devices with which payment for the transaction can be made;
an imaging device including a camera configured to capture images in an area where the registration device and the payment devices are located and a processor that is configured to determine, based on the images captured by the camera, one of the plurality of payment devices as a destination for receiving payment data for the transaction and settling the transaction; and
a server in communication with the registration device, the plurality of payment devices, and the imaging device, wherein
the payment data is sent to and received by the payment device determined to be the destination, and not received by the other payment devices of the plurality of payment devices,
the imaging device transmits destination information about the determined destination to the server, and the registration device generates first payment data for the transaction and transmits the first payment data to the server, and
the server generates second payment data from the first payment data and transmits the second payment data to one of the plurality of payment devices according to the destination information.

2. The POS system according to claim 1, wherein the plurality of payment devices include a first payment device and a second payment device, and the processor determines the first payment device to be the destination when a target object in the captured images moves from a first area near the registration device to a second area near the first payment device.

3. The POS system according to claim 2, wherein the target object is a basket for carrying a registered item.

4. The POS system according to claim 2, wherein the target object is a registered item.

5. The POS system according to claim 4, wherein the registered item is designated as the target object using an input device of the registration device.

6. The POS system according to claim 2, wherein the payment data is sent to the first payment device in response to a query for the payment data from the first payment device, and no payment data is sent to the second payment device in response to a query for the payment data from the second payment device.

7. The POS system according to claim 1, wherein the images are captured after an instruction to end registering items for the transaction, is input at the registration device.

8. The POS system according to claim 1, wherein the imaging device transmits destination information about the determined destination to the registration device, and
the registration device generates first payment data for the transaction and transmits the first payment data to one of the plurality of payment devices according to the destination information.

9. A point-of-sale (POS) system comprising:
a registration device configured to register items for a transaction;
a plurality of payment devices with which payment for the transaction can be made; and
an imaging device including a camera configured to capture images in an area where the registration device and the payment devices are located and a processor that is configured to determine, based on the images captured by the camera, one of the plurality of payment devices as a destination for receiving payment data for the transaction and settling the transaction, wherein
the payment data is sent to and received by the payment device determined to be the destination, and not received by the other payment devices of the plurality of payment devices,
the registration device generates first payment data for the transaction to the imaging device, and
the imaging device generates third payment data from the first payment data and transmits the third payment data to one of the plurality of payment devices determined to be the destination.

10. A method of determining a payment device with which payment for a point-of-sale (POS) transaction can be made, comprising:
capturing, by an imaging device, images in an area where a registration device configured to register items for the transaction and a plurality of payment devices with which payment for the transaction can be made, are located;
determining, based on the captured images, one of the plurality of payment devices as a destination for receiving payment data for the transaction and settling the transaction; and
transmitting the payment data to the payment device determined to be the destination, wherein
the payment data is not received by the other payment devices of the plurality of payment devices, the imaging device transmits destination information about the determined destination to a server, and the registration device generates first payment data for the transaction and transmits the first payment data to the server, and the server generates second payment data from the first payment data and transmits the second payment data to one of the plurality of payment devices according to the destination information.

11. The method according to claim 10, wherein the plurality of payment devices include a first payment device and a second payment device, and the first payment device is determined to be the destination when a target object in the captured images moves from a first area near the registration device to a second area near the first payment device.

12. The method according to claim 11, wherein the target object is a basket for carrying a registered item.

13. The method according to claim 11, wherein the target object is a registered item.

14. The method according to claim 13, wherein the registered item is designated as the target object using an input device of the registration device.

15. The method according to claim 11, wherein the payment data is sent to the first payment device in response to a query for the payment data from the first payment device, and no payment data is sent to the second payment device in response to a query for the payment data from the second payment device.

16. The method according to claim 10, wherein the images are captured after an instruction to end registering items for the transaction is input at the registration device.

17. The method according to claim 10, wherein the imaging device transmits destination information about the determined destination to the registration device, and the registration device generates first payment data for the transaction and transmits the first payment data to one of the plurality of payment devices according to the destination information.

18. The method according to claim 10, wherein the registration device generates first payment data for the transaction to the imaging device, and the imaging device generates third payment data from the first payment data and transmits the third payment data to one of the plurality of payment devices determined to be the destination.

* * * * *